United States Patent
Nolan et al.

(10) Patent No.: US 9,466,325 B2
(45) Date of Patent: Oct. 11, 2016

(54) PATTERNED GROWTH GUIDING MECHANISM

(71) Applicant: SEAGATE TECHNOLOGY LLC, Cupertino, CA (US)

(72) Inventors: Thomas P. Nolan, Fremont, CA (US); Kim Y. Lee, Fremont, CA (US); Shuaigang Xiao, Fremont, CA (US); Tom Chang, Menlo Park, CA (US); Yingguo Peng, San Ramon, CA (US)

(73) Assignee: Seagate Technology LLC, Cupertino, CA (US)

(*) Notice: Subject to any disclaimer, the term of this patent is extended or adjusted under 35 U.S.C. 154(b) by 209 days.

(21) Appl. No.: 14/308,632

(22) Filed: Jun. 18, 2014

(65) Prior Publication Data

US 2015/0017481 A1    Jan. 15, 2015

Related U.S. Application Data

(60) Provisional application No. 61/844,427, filed on Jul. 10, 2013.

(51) Int. Cl.
*G11B 5/85* (2006.01)
*G11B 5/855* (2006.01)

(52) U.S. Cl.
CPC ................................. *G11B 5/855* (2013.01)

(58) Field of Classification Search
USPC ......................................................... 216/22
See application file for complete search history.

(56) References Cited

U.S. PATENT DOCUMENTS

| | | | |
|---|---|---|---|
| 2006/0260945 A1* | 11/2006 | Miyake | C25D 5/022 205/119 |
| 2007/0224455 A1* | 9/2007 | Iida | G11B 5/855 428/831.2 |
| 2010/0033872 A1* | 2/2010 | Xi | B82Y 10/00 360/135 |
| 2010/0055621 A1* | 3/2010 | Hatakeyama | H01L 21/0275 430/323 |
| 2010/0183957 A1* | 7/2010 | Wang | G11B 5/743 430/5 |
| 2012/0138567 A1* | 6/2012 | Hirano | G11B 5/8404 216/22 |
| 2014/0162194 A1* | 6/2014 | Xu | H01L 21/02118 430/403 |

* cited by examiner

*Primary Examiner* — Shamim Ahmed

(57) ABSTRACT

Provided herein are apparatuses and methods related to creating a patterned resist layer on a substrate; selectively treating at least a resist-contacting layer of the substrate in contact with the patterned resist layer to create a patterned growth guiding mechanism and growing patterned magnetic features guided by the patterned growth guiding mechanism.

20 Claims, 27 Drawing Sheets

PREPATTERNED MEDIA GROWTH PROCESS USING A DOUBLE DENSITY ALD CHEMICAL TEMPLATE

PATTERNED GROWTH GUIDING MECHANISM

CROSS REFERENCE

This application claims the benefit of U.S. Provisional Patent Application No. 61/844,427, filed Jul. 10, 2013, which is incorporated herein by reference in its entirety.

SUMMARY

Provided herein are apparatuses and methods related to creating a patterned resist layer on a substrate; selectively treating at least a resist-contacting layer of the substrate in contact with the patterned resist layer to create a patterned growth guiding mechanism; and growing patterned magnetic features guided by the patterned growth guiding mechanism.

DETAILED DESCRIPTION

Figure 1A:
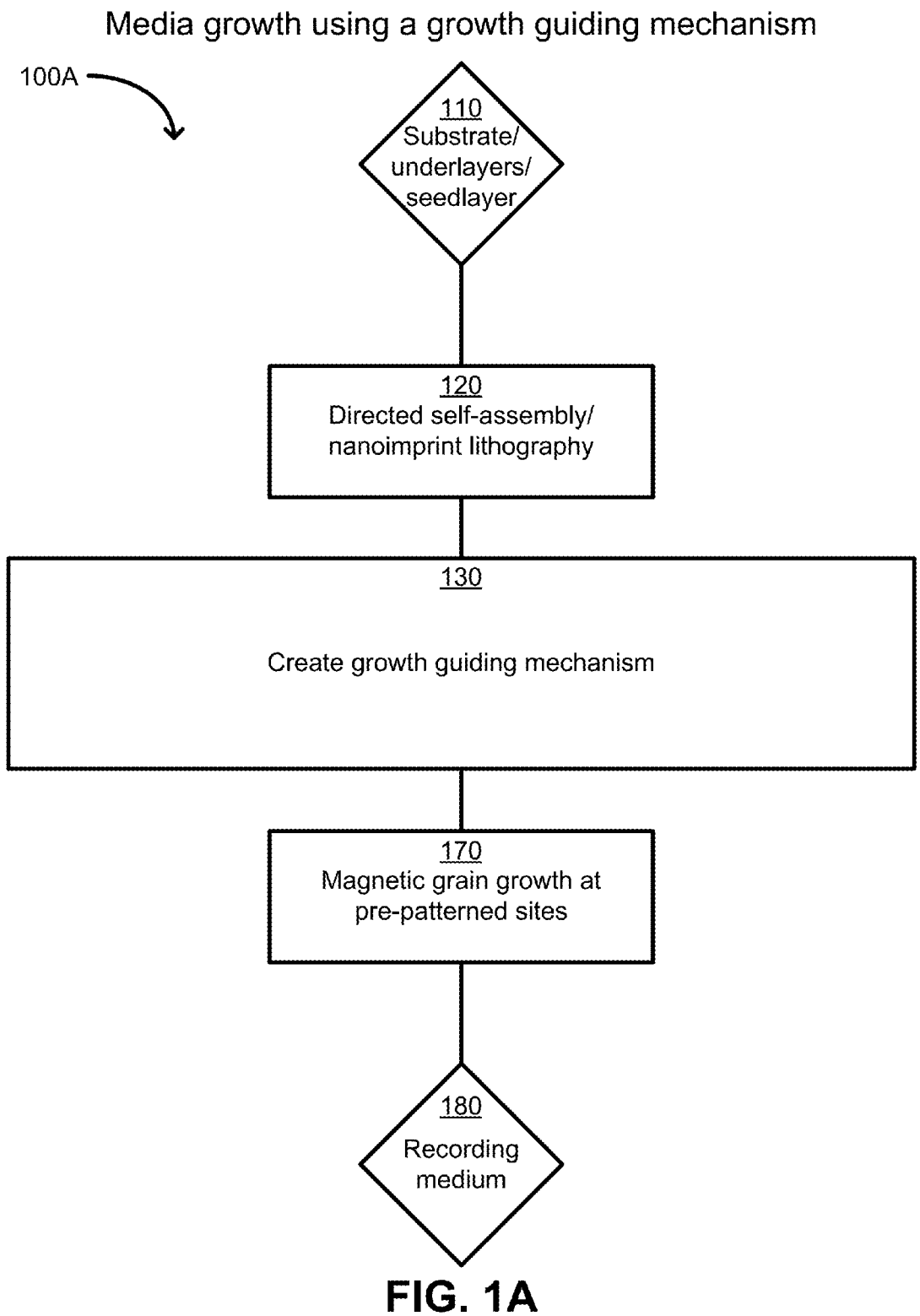
FIG. 1A shows a block diagram of an overview for creating a recording medium using patterned growth guiding mechanism in accordance with some embodiments.

In a following description, reference is made to the accompanying drawings, which form a part hereof, and in which is shown by way of illustration a specific example in which the embodiments may be practiced. It is to be understood that other embodiments may be utilized and structural changes may be made without departing from the scope of the concepts provided herein.

It should be noted that the descriptions that follow, for example, in terms of a patterned growth guiding mechanism, are described for illustrative purposes and the underlying system may apply to any number and multiple types of perpendicular magnetic recording media including bit patterned media and heat assisted magnetic recording media and combinations of them. In some embodiments, the patterned growth guiding mechanism may be formed by selectively etching a first layer of a substrate to create a patterned growth guiding mechanism. The patterned growth guiding mechanism may be configured to include growing patterned magnetic features guided by the growth guiding mechanism in accordance with some embodiments.

Bit patterned media (BPM) are formed by processes to make patterned arrays of spaced magnetic pillars or particles with center to center spacing in the range of about 5-30 nm. Fabrication methods try to carefully control the particle size; particle separation; particle position; particle crystallographic, magnetic, and microstructural properties; interparticle interactions; etc.; to provide effective BPM recording media. Many patterning procedures comprise depositing the magnetic material onto appropriate seedlayers, often by sputter deposition, to produce a blanket thin film of a predetermined structure and composition. The material is then patterned into the predetermined pillar structure (dots, islands) by removing magnetic material in regions between the predetermined pillar locations (trenches).

Such removal is generally performed by ion beam etching through a mask to selectively remove material in predetermined locations. The selectivity of the etching process may not be perfect. Thus, the sensitive magnetic properties of the recording layer may be damaged by stray ion implantation at the pillar edges as well as through the mask. The etch process generally has limited aspect ratio, and normally has to be greater than 10 nm deep, to remove the entire magnetic layer. This causes more damage to the top of the pillars and limits the position control and isolation of very small scale pattern features. This process results in a larger than predetermined variation of feature sizes that increases with the depth of the pattern feature. After conventional patterning processes, refill and planarization are used so as to provide a flyable head-disk interface. Such extra processes may add complexity and cost.

HAMR media inherently have a very limited known workable materials set. MgO is capable of providing the growth template, diffusion barrier, thermal resistor, etc., to form a high anisotropy, exchange decoupled L10 FePt alloy magnetic recording layer. This material combination is extremely difficult to manufacture owing to low conductivity for sputter processing and high particle generation of MgO combined with the difficulty of particle isolation and high temperature phase ordering of FePt alloys.

Provided in some embodiments are 1. Rectified intrinsic magnetic material properties of the post-patterning features; 2. Steeper, more vertical side-walls on patterned features; 3. More accurate positioning of the pattern features; 4. More accurate control of the spacing between pattern features; 5. More uniform spacing between pattern features; 6. Control of the composition profile of materials in the spacing between pattern features; and/or 7. Reduced surface topography (roughness) of the post-patterning device.

FIG. 1A shows a block diagram of an overview for creating a recording medium using a patterned growth guiding mechanism in accordance with some embodiments. As shown in the block diagram 100A, the overview commences with a substrate (e.g., glass) including one or more underlayers (e.g., one or more soft underlayers) and a seedlayer (e.g., TiN, Pt, CrX, wherein X is a Cr-alloying element) at a step 110. At a step 120, the substrate may be subjected to directed self-assembly, nanoimprint lithography, or a combination of directed self-assembly and nanoimprint lithography to create a pre-pattern on the substrate. At a step 130, the pre-pattern may be used to create a growth guiding mechanism or template for growing magnetic features including magnetic grains of the magnetic recording medium. At a step 170, the magnetic features may be grown on the substrate, and subsequent steps encompassed by a step 180 may yield the recording medium.

Figure 1B:
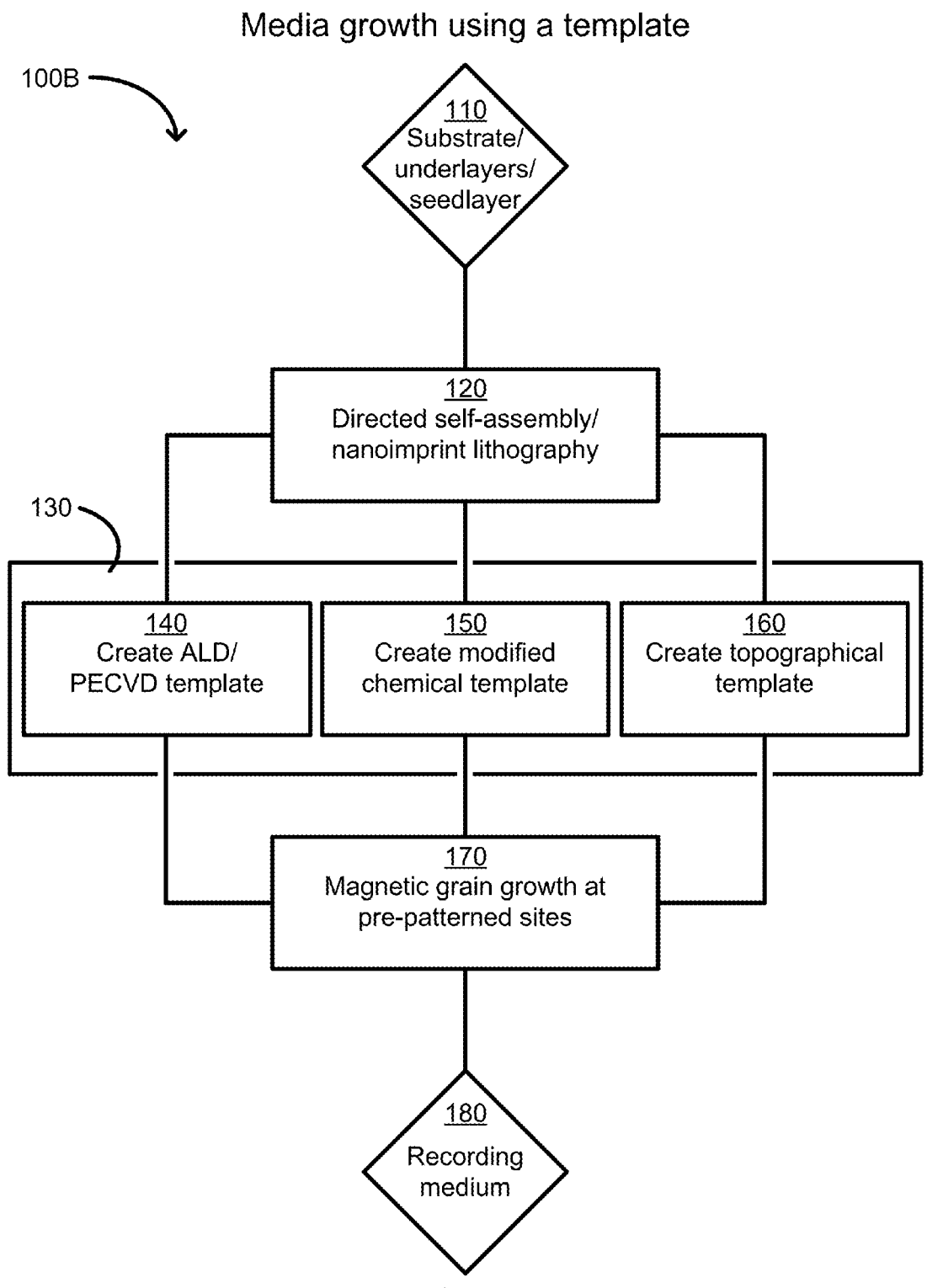
FIG. 1B shows a block diagram of an overview for creating a recording medium using patterned growth guiding mechanism in accordance with some embodiments.

FIG. 1B shows a block diagram of an overview for creating a recording medium using a patterned growth guiding mechanism in accordance with some embodiments. As shown in the block diagram 100B, the overview expands upon the block diagram 100A of FIG. 1A. Specifically, at the step 130 of FIG. 1A, FIG. 1B shows three different growth guiding mechanisms or templates for growing magnetic features including magnetic grains of the magnetic recording medium. Subsequent to the step 120, the pre-pattern may be used in a step 140 to create a growth guiding mechanism or template through a deposition process such as an atomic layer deposition (ALD) or plasma-enhanced chemical vapor deposition (PECVD). Alternatively, the pre-pattern may be used in a step 150 to create a growth guiding mechanism or template through a chemical modification process. Alternatively, the pre-pattern may be used in a step 160 to create a topographically based growth guiding mechanism or template. Subsequent to creating a growth guiding mechanism or template through one of the steps 140, 150, or 160, the magnetic features may be grown on the substrate at the step 170, and subsequent steps encompassed by the step 180 may yield the recording medium.

Figure 1C:
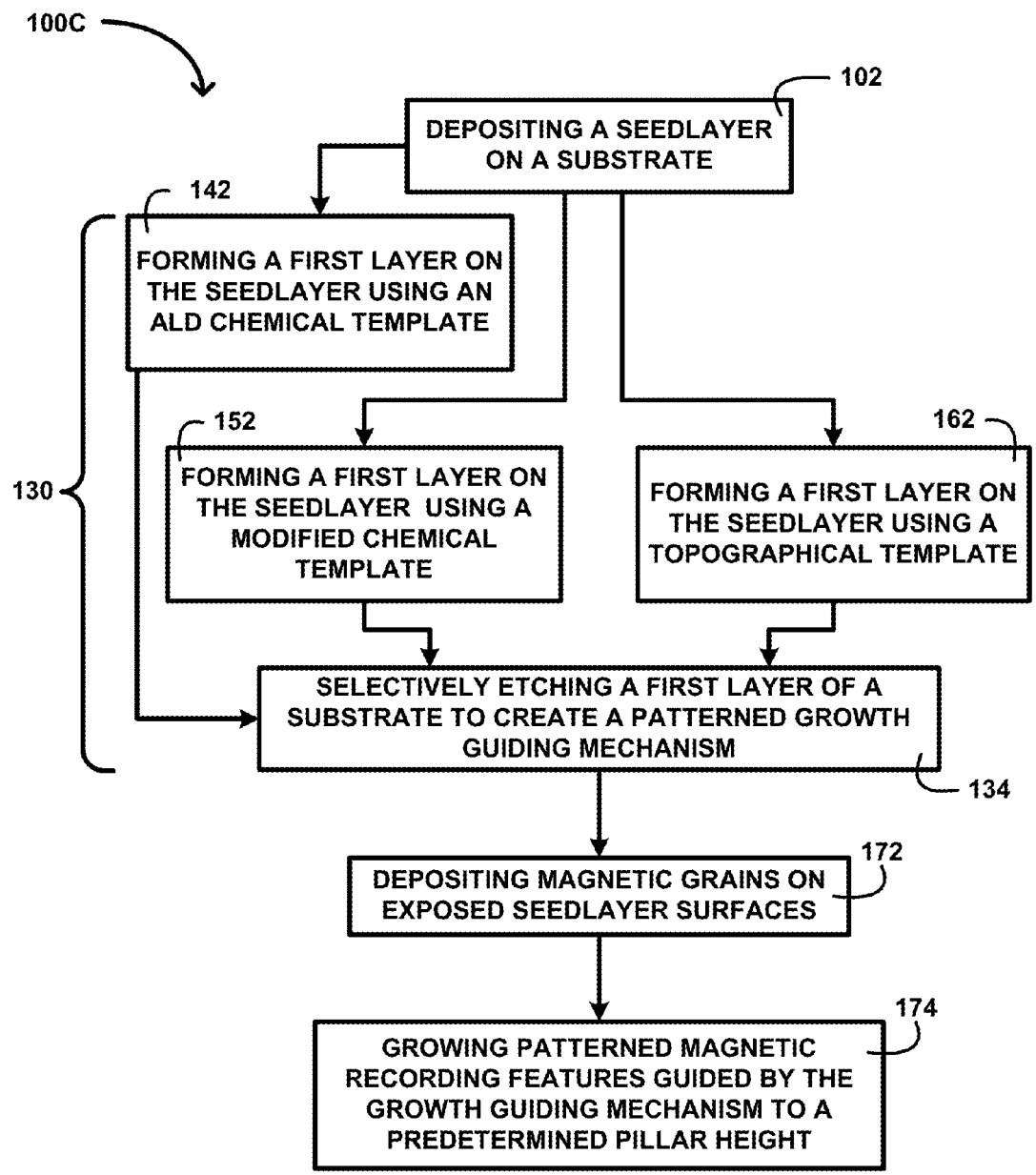
FIG. 1C shows a block diagram of an overview of a bit patterned growth guiding mechanism in accordance with some embodiments.

FIG. 1C shows a block diagram 100C of an overview of a patterned growth guiding mechanism in accordance with some embodiments. FIG. 1C shows depositing a seedlayer on a substrate at a step 102 and forming a first layer on the seedlayer using an ALD chemical template or a double density ALD chemical template at a step 142, where ALD refers to an Atomic Layer Deposition. FIG. 1C also shows forming a first layer on the seedlayer using a modified chemical template at a step 152, and forming a first layer on the seedlayer using a topographical template at a step 162. The process continues with creating a growth guiding mechanism in accordance with the pre-patterned first layer. The process includes selectively etching a first layer of a substrate to create a patterned growth guiding mechanism at a step 134. A process is used for depositing magnetic grains on exposed seedlayer surfaces at a step 172. Growing patterned magnetic recording features guided by the growth guiding mechanism to a predetermined pillar height at a step 174 fabricates the patterned magnetic recording features without damage from etching the patterned magnetic recording features.

The patterned growth guiding mechanism allows growing the magnetic grains perpendicular to the seedlayer to a predetermined pillar height. The predetermined pillar height includes the height of 3-dimensional, protruding magnetic features including cylindrical-shaped magnetic features (cylinders), cuboid-shaped magnetic features including square and rectangular patterned protrusions (squares and/or square islands), and magnetic features using other shapes and orientations. Growing the magnetic grains perpendicular to the seedlayer includes growing grains inside the cylinders, square islands and other shapes and orientations. The boundaries of the 3-dimensional, protruding magnetic features are defined by the growth guiding mechanism in accordance with the pre-patterned seedlayer. The perpendicular growth creates vertical sides of the grown magnetic pillar grains that forms the perpendicular magnetic recording magnetic features without having to perform an etch to remove material to form the patterned features thereby preventing damage to the magnetic materials in accordance with some embodiments.

Figure 2A:
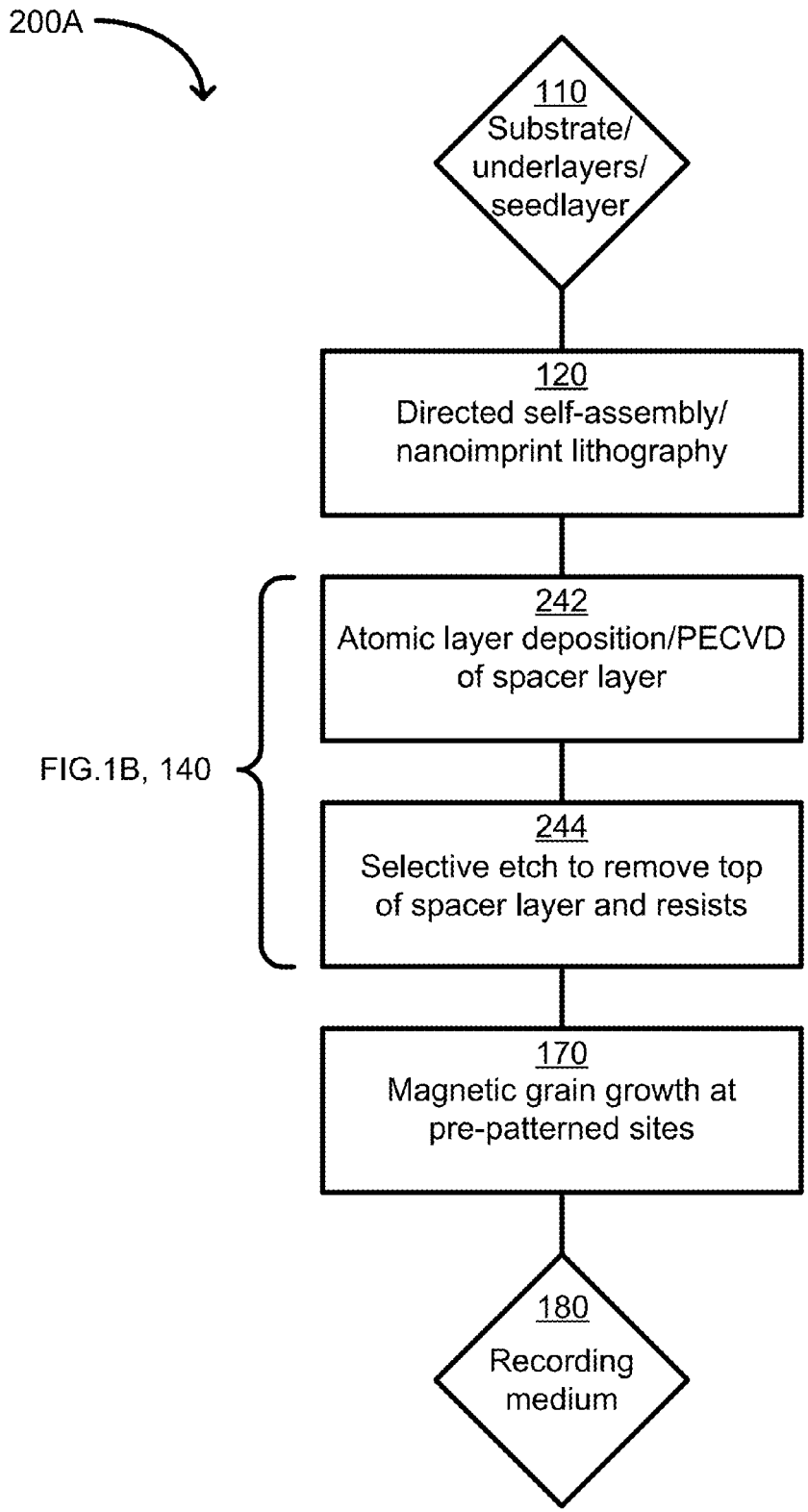
FIG. 2A shows a block diagram of an overview flow chart of fabricating a recording medium through an ALD/PECVD template in accordance with some embodiments.
Figure 6A:
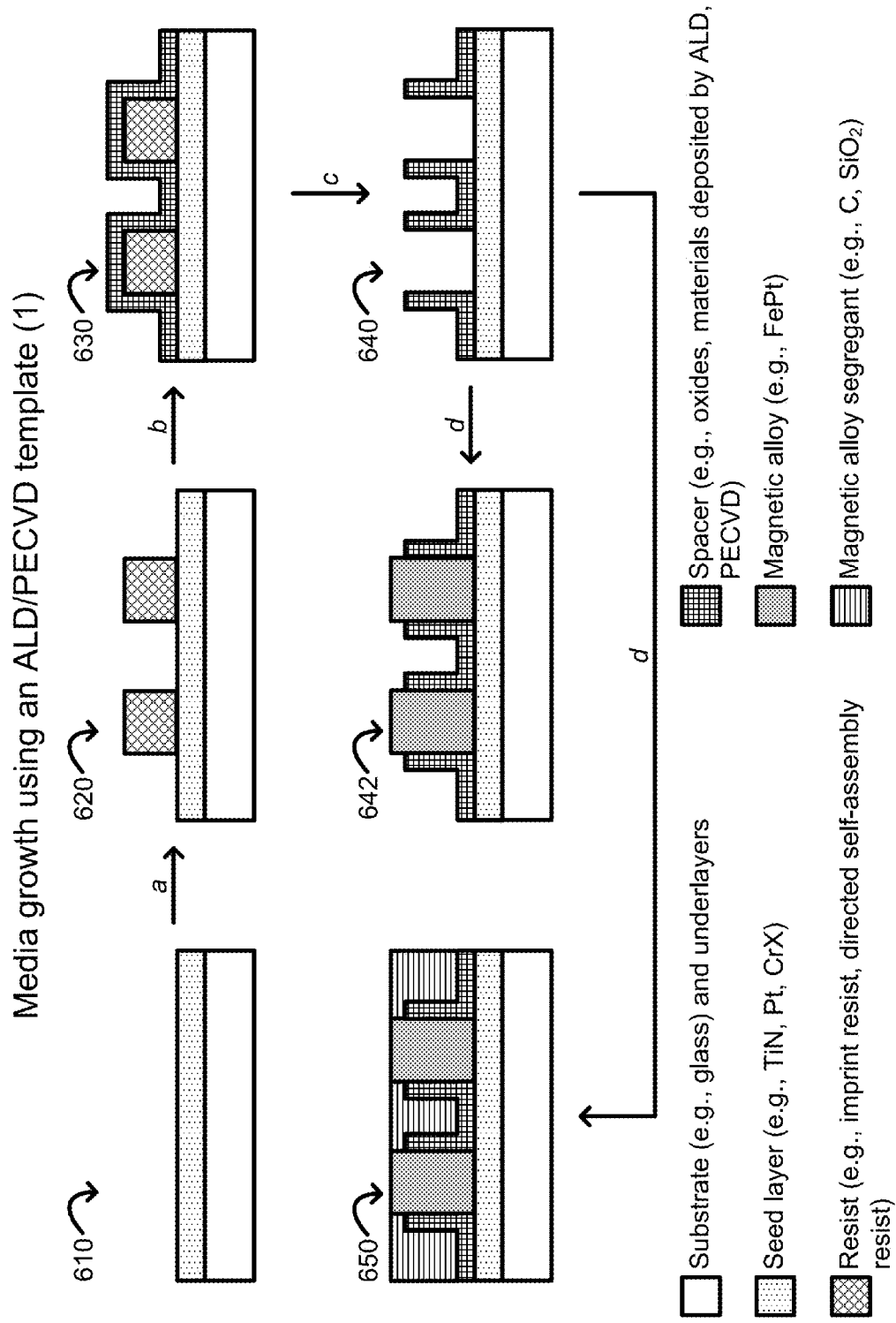
FIG. 6A shows for illustrative purposes only, an example of a process using an ALD/PECVD template in accordance with some embodiments.

FIG. 2A shows a block diagram of an overview flow chart of fabricating a recording medium through an ALD/PECVD template in accordance with some embodiments. As shown in the block diagram 200A, the overview flow chart commences with a substrate (e.g., glass) including one or more underlayers (e.g., one or more soft underlayers) and a seedlayer (e.g., TiN, Pt, CrX, wherein X is a Cr-alloying element) at the step 110. At the step 120, the substrate may be subjected to directed self-assembly, nanoimprint lithography, or a combination of directed self-assembly and nanoimprint lithography to create a pre-pattern on the substrate. At a step 242, the pre-pattern may be used to create a spacer layer for the growth guiding mechanism or template through ALD, PECVD, or any other deposition process for creating a conformal spacer layer. At a step 244, a selective etch (e.g., grazing angle etch) may be used to selectively remove the top of the spacer layer and underlying resists as shown in FIG. 6A and discussed herein in reference thereto. The selective etch yields the growth guiding mechanism or template, which may be utilized in the step 170 for growing magnetic features including magnetic grains of the magnetic recording medium. Subsequent steps encompassed by the step 180 may yield the recording medium.

Figure 2B:
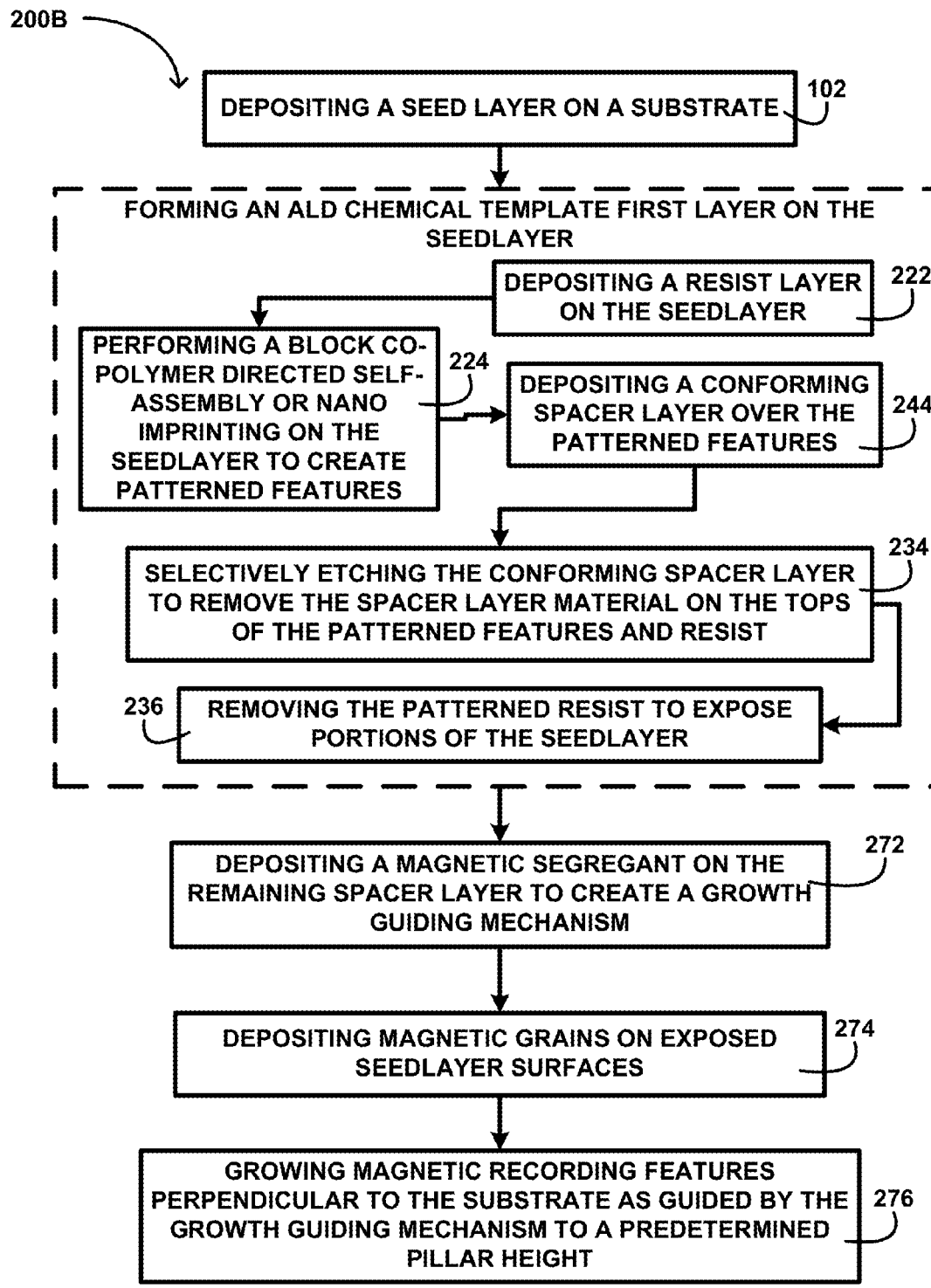
FIG. 2B shows a block diagram of an overview flow chart of fabricating patterned media using an ALD chemical template pre-patterned seedlayer in accordance with some embodiments.

FIG. 2B shows a block diagram of an overview flow chart of fabricating patterned media using an ALD chemical template pre-patterned seedlayer in accordance with some embodiments. FIG. 2B shows a process that includes depositing a seedlayer on a substrate at the step 102, and forming an ALD chemical template first layer on the seedlayer. A resist layer may be deposited on the seedlayer at a step 222, and a block co-polymer directed self-assembly or nano imprinting may be performed on the seedlayer to create patterned features at a step 224. The process continues by depositing a conforming spacer layer over the patterned features at a step 243, and selectively etching the conforming spacer layer to remove the spacer layer material on the tops of the patterned features and resist at a step 245. The process includes removing the patterned resist at step 247 to expose portions of the seedlayer, thereby forming the ALD chemical template first layer. Depositing a magnetic segregant on the remaining spacer layer at a step 271; depositing magnetic grains on exposed seedlayer surfaces at the step 172; and growing magnetic recording features perpendicular to the substrate to a predetermined pillar height may be guided by the growth guiding mechanism. Vertical sides of the magnetic grain pillars are maintained by segregating the growth of magnetic grains and magnetic alloy segregant. The cylinders, square islands and other shapes and orientations in which the magnetic grains are grown inside of are shapes formed using the magnetic alloy segregant. The vertical sides of the shapes being a magnetic alloy segregant inhibits the growth of the magnetic grains from growing outwardly and/or laterally through the magnetic alloy segregant sides. This guides the growth of the magnetic grains perpendicularly from the surface of the seedlayer within the vertical sides of the magnetic alloy segregant shapes. The vertical growth guidance of the growth guiding mechanism produces perpendicular magnetic recording magnetic features without a process to vertically etch the features thereby eliminating a fabrication step that may cause damage to the physical and magnetic properties of the magnetic features in accordance with some embodiments.

Figure 3A:
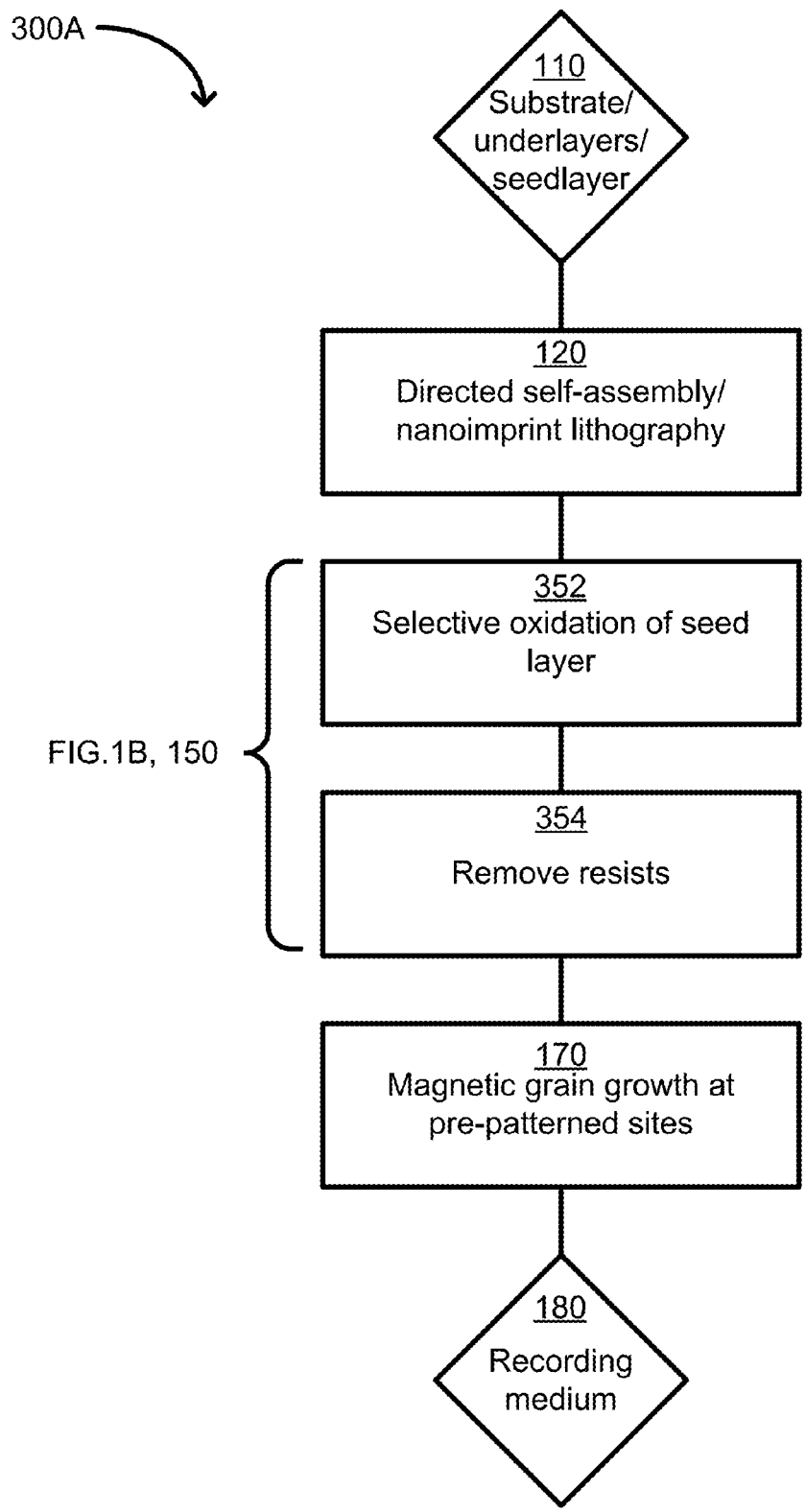
FIG. 3A shows a block diagram of an overview flow chart of fabricating a recording medium through a modified chemical template in accordance with some embodiments.
Figure 9:
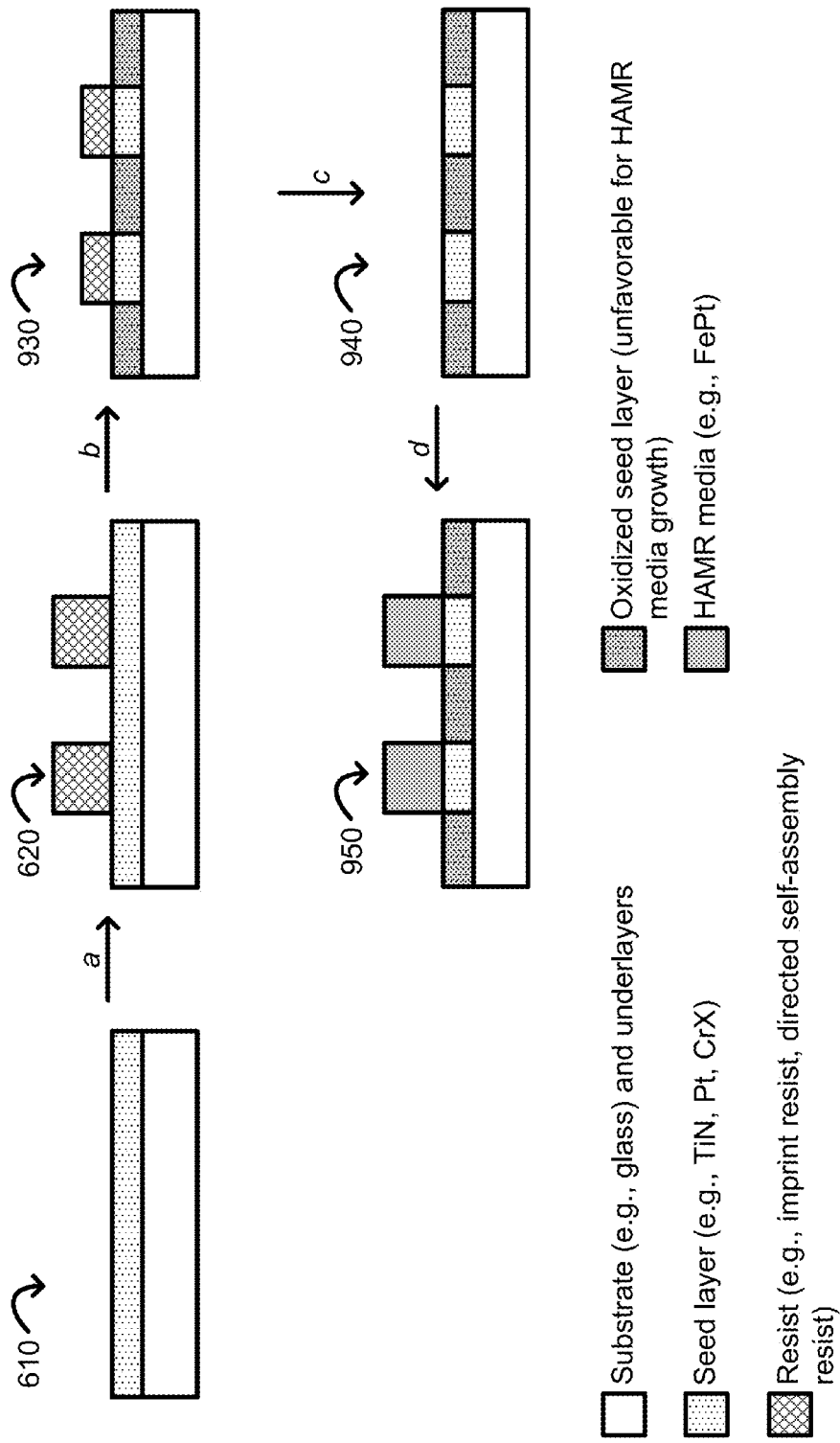
FIG. 9 shows for illustrative purposes only, an example of a process using a modified chemical template in accordance with some embodiments.

FIG. 3A shows a block diagram of an overview flow chart of fabricating a recording medium through a modified chemical template in accordance with some embodiments. As shown in the block diagram 300A, the overview flow chart commences with a substrate (e.g., glass) including one or more underlayers (e.g., one or more soft underlayers) and a seedlayer (e.g., TiN, Pt, CrX, wherein X is a Cr-alloying element) at the step 110. At the step 120, the substrate may be subjected to directed self-assembly, nanoimprint lithography, or a combination of directed self-assembly and nanoimprint lithography to create a pre-pattern on the substrate. At a step 352, the pre-pattern may be used for chemical modification such as selective oxidation (e.g., directional oxygen plasma) of the seedlayer, and at a step 354, resists on the seedlayer may be removed as shown in FIG. 9 and discussed herein in reference thereto. The selective oxidation and removal of resists yields the growth guiding mechanism or template, which may be utilized in the step 170 for growing magnetic features including magnetic grains of the magnetic recording medium. Subsequent steps encompassed by the step 180 may yield the recording medium.

Figure 3B:
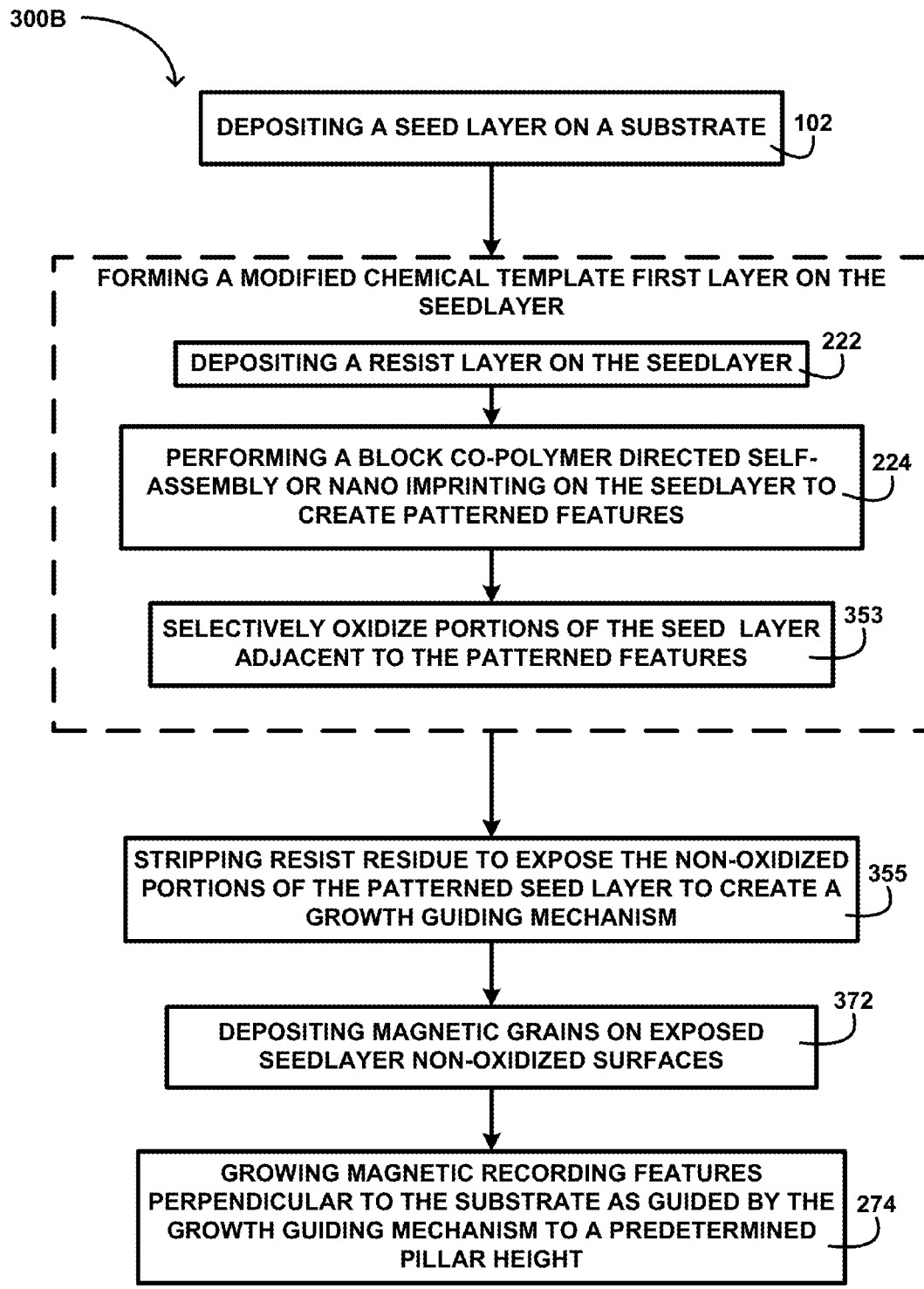
FIG. 3B shows a block diagram of an overview flow chart of fabricating patterned media using a modified chemical template pre-patterned seedlayer in accordance with some embodiments.

FIG. 3B shows a block diagram of an overview flow chart of fabricating patterned media using a modified chemical template pre-patterned seedlayer in accordance with some embodiments. FIG. 3B shows a process including depositing a seedlayer on a substrate at the step 102, and forming a modified chemical template first layer on the seedlayer. A resist layer may be deposited on the seedlayer at the step 222, and a block co-polymer directed self-assembly or nano imprinting may be performed on the seedlayer to create patterned features at the step 224. Processing continues with creating a growth guiding mechanism in accordance with the modified chemical template pre-patterned layer including a process to selectively oxidize portions of the seedlayer adjacent to the patterned features in a step 353. Process steps include stripping resist residue to expose the non-oxidized patterned seedlayer in a step 355, and depositing magnetic grains on exposed seedlayer non-oxidized surfaces in a step 372. This promotes growing magnetic recording features perpendicular to the substrate in a step 274 as guided by the growth guiding mechanism to a predetermined pillar height in accordance with some embodiments.

Figure 4A:
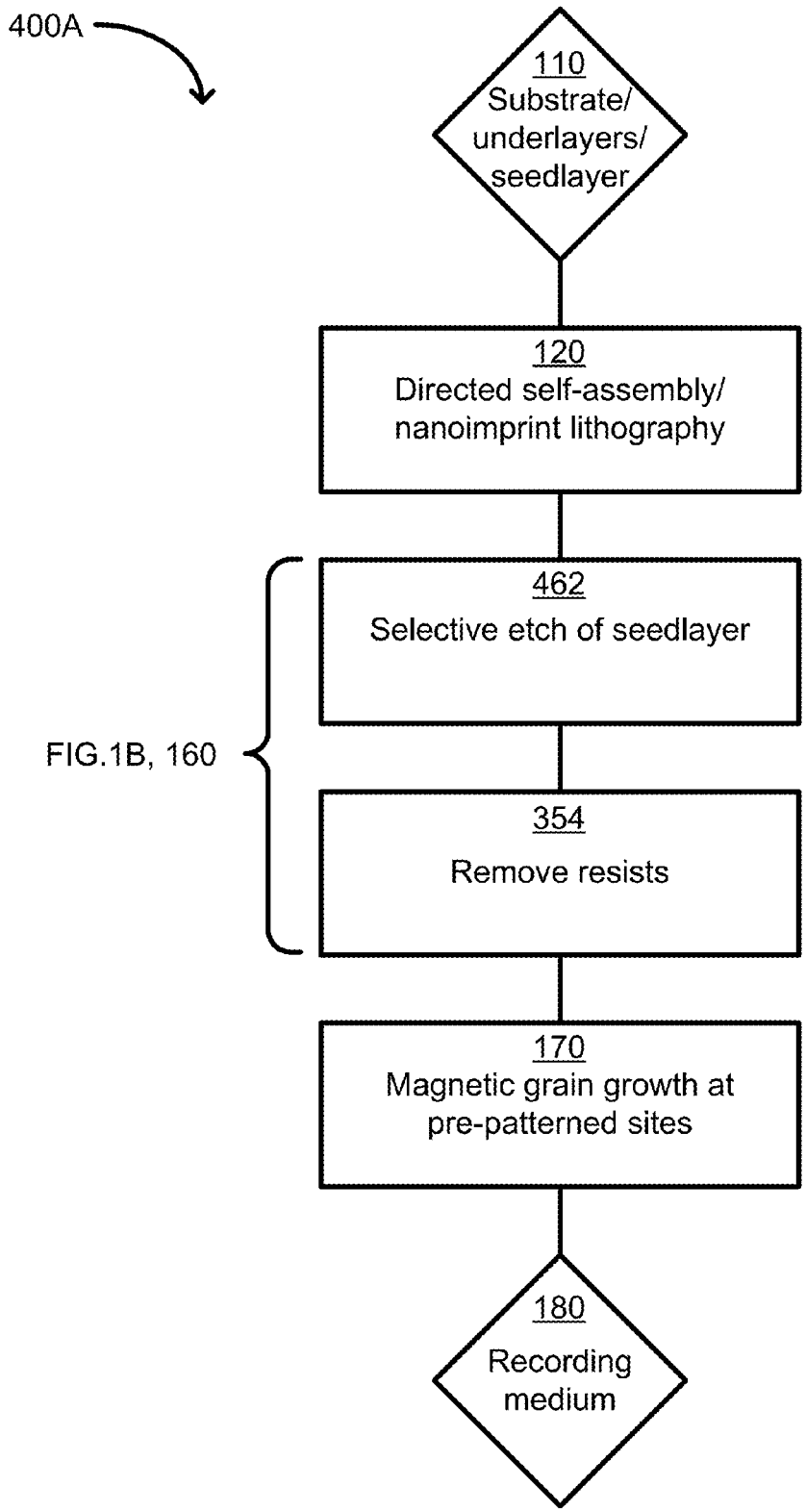
FIG. 4A shows a block diagram of an overview flow chart of fabricating a recording medium through a topographical template in accordance with some embodiments.
Figure 11:
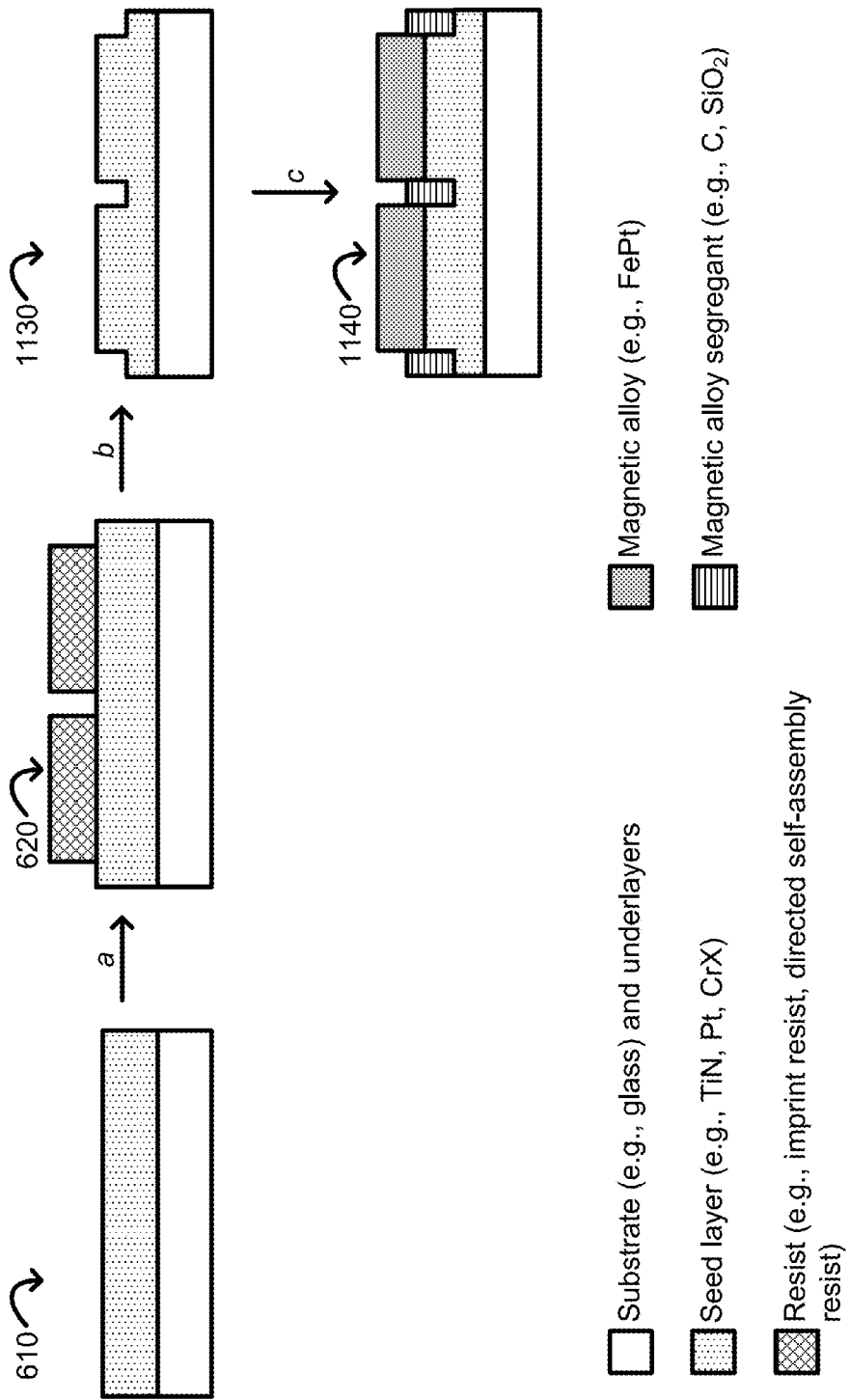
FIG. 11 shows for illustrative purposes only, an example of a process using a topographical template in accordance with some embodiments.

FIG. 4A shows a block diagram of an overview flow chart of fabricating a recording medium through a topographical template in accordance with some embodiments. As shown in the block diagram 400A, the overview flow chart commences with a substrate (e.g., glass) including one or more underlayers (e.g., one or more soft underlayers) and a seedlayer (e.g., TiN, Pt, CrX, wherein X is a Cr-alloying element) at the step 110. At the step 120, the substrate may be subjected to directed self-assembly, nanoimprint lithography, or a combination of directed self-assembly and nanoimprint lithography to create a pre-pattern on the substrate. At a step 462, the pre-pattern may be used for etching the seedlayer, and at the step 354, resists on the seedlayer may be removed as shown in FIG. 11 and discussed herein in reference thereto. The etching (and subsequent removal of resists) yields the growth guiding mechanism or template, which may be utilized in the step 170 for growing magnetic features including magnetic grains of the magnetic recording medium. Subsequent steps encompassed by the step 180 may yield the recording medium.

Figure 4B:
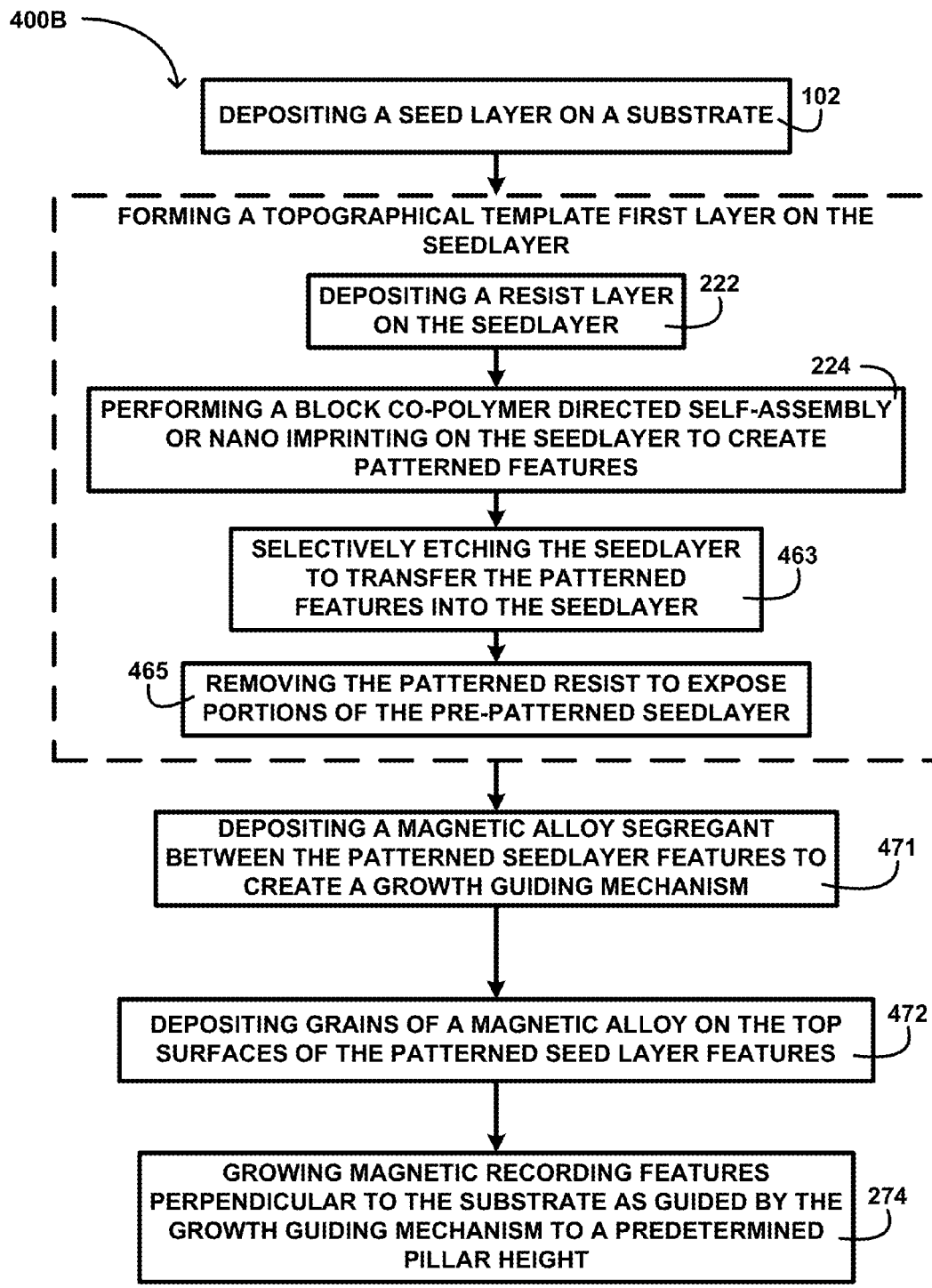
FIG. 4B shows a block diagram of an overview flow chart of fabricating patterned media using a topographical template pre-patterned seedlayer in accordance with some embodiments.

FIG. 4B shows a block diagram of an overview flow chart of fabricating patterned media using a topographical template pre-patterned seedlayer in accordance with some embodiments. FIG. 4B shows a process including depositing a seedlayer on a substrate at the step 102 and forming a topographical template first layer on the seedlayer. A resist layer may be deposited on the seedlayer at the step 222, and a block co-polymer directed self-assembly or nano imprinting may be performed on the seedlayer to create patterned features at the step 224. The process continues with selectively etching the seedlayer to transfer the patterned features into the seedlayer at a step 463. Process steps include removing the patterned resist to expose the patterned seedlayer at a step 465, and depositing a magnetic alloy segregant between the patterned seedlayer features to create a growth guiding mechanism at a step 471. As such, the topographical template first layer is formed by selectively etching the seedlayer to transfer the patterned features into the seedlayer at the step 463, removing the patterned resist to expose portions of the pre-patterned seedlayer at the step 465, and depositing a magnetic alloy segregant between the patterned seedlayer features to create a growth guiding mechanism at the step 471. The steps continue with depositing grains of a magnetic alloy on the top surfaces of the patterned seedlayer features at a step 472. The process includes growing magnetic recording features perpendicular to the substrate in the step 274 as guided by the growth guiding mechanism to a predetermined pillar height in accordance with some embodiments.

Figure 5A:
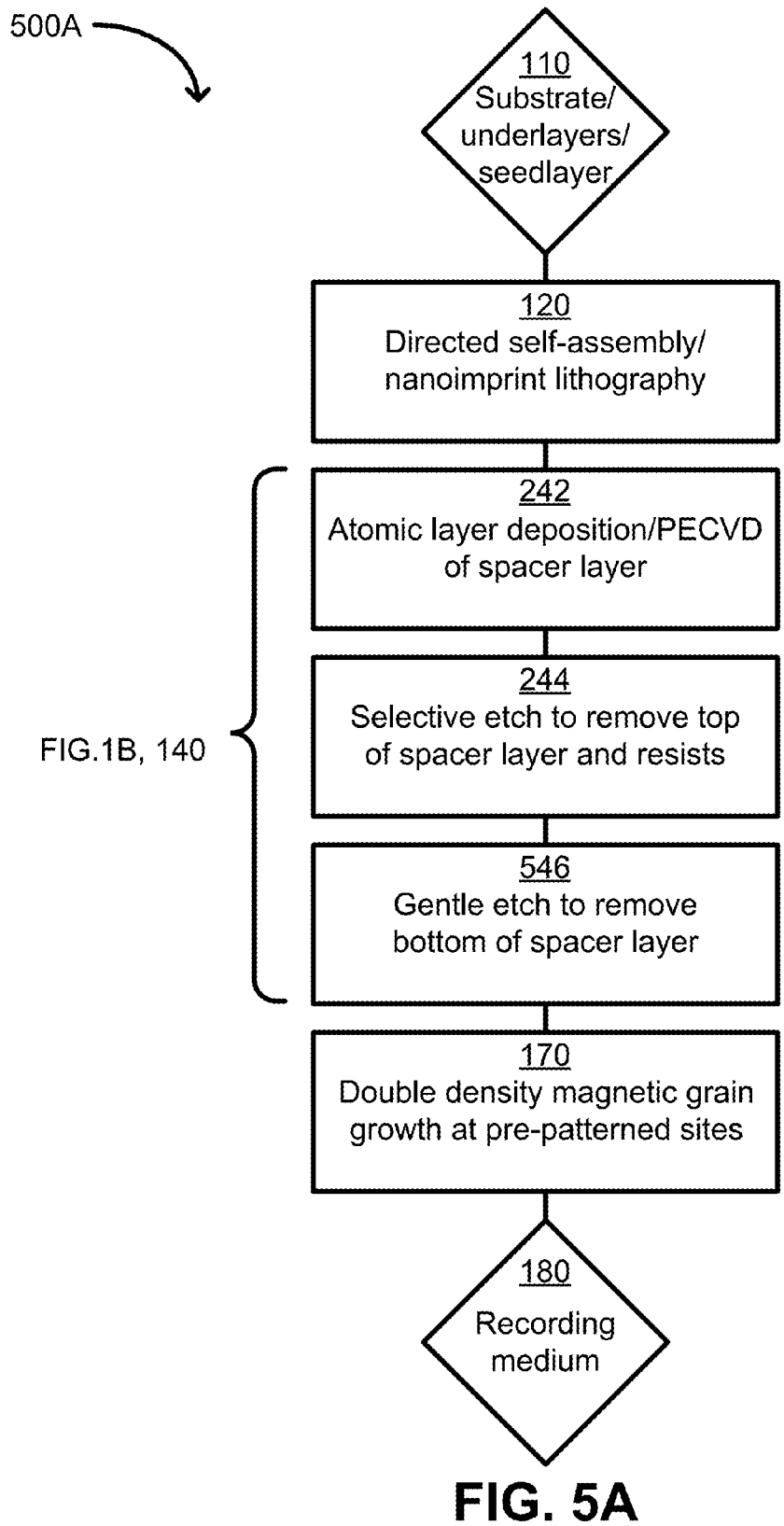
FIG. 5A shows a block diagram of an overview flow chart of fabricating a recording medium through an ALD/PECVD template in accordance with some embodiments.
Figure 13:
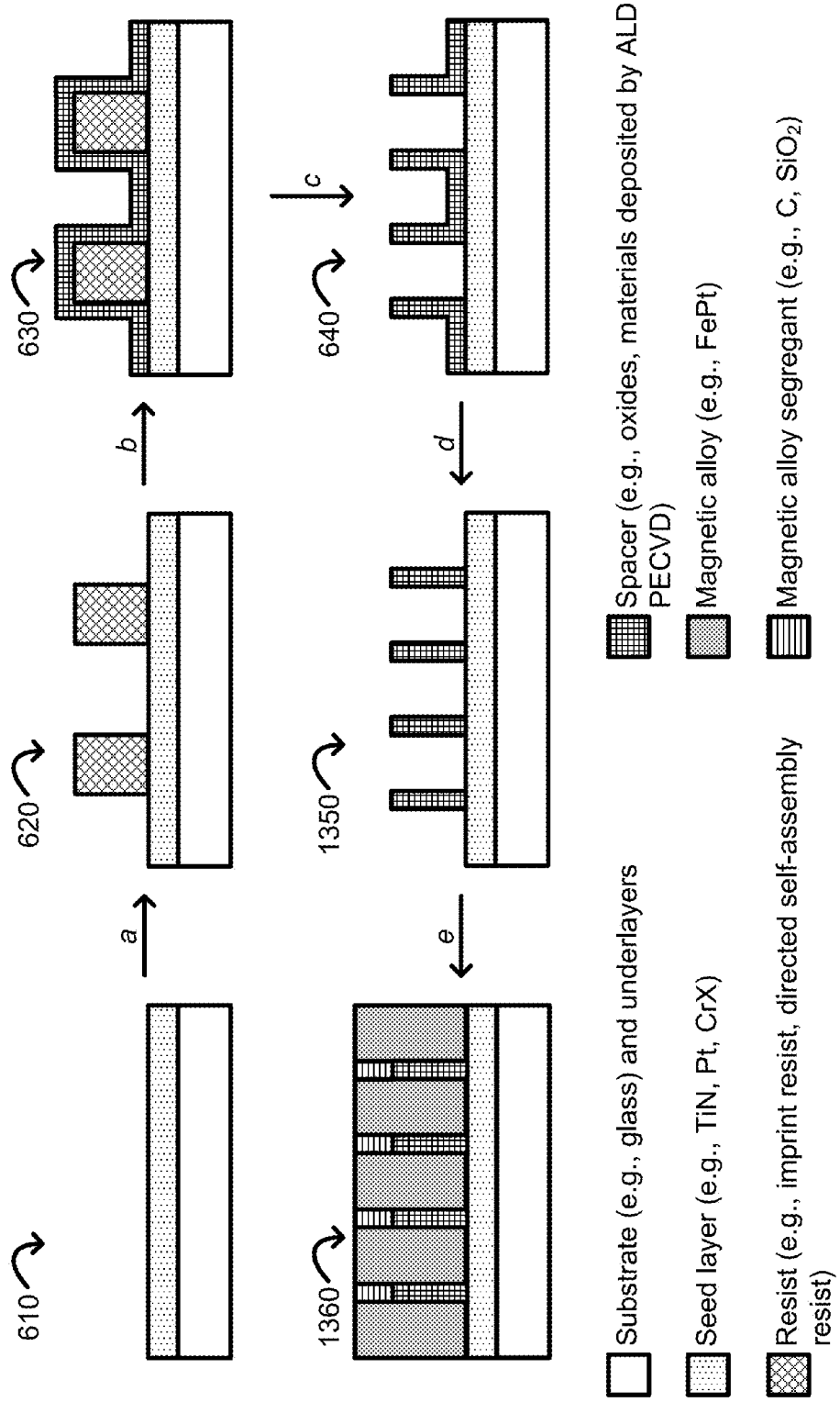
FIG. 13 shows for illustrative purposes only, an example of a process using an ALD/PECVD template in accordance with some embodiments.

FIG. 5A shows a block diagram of an overview flow chart of fabricating a recording medium through an ALD/PECVD template in accordance with some embodiments. As shown in the block diagram 500A, the overview flow chart commences with a substrate (e.g., glass) including one or more underlayers (e.g., one or more soft underlayers) and a seedlayer (e.g., TiN, Pt, CrX, wherein X is a Cr-alloying element) at the step 110. At the step 120, the substrate may be subjected to directed self-assembly, nanoimprint lithography, or a combination of directed self-assembly and nanoimprint lithography to create a pre-pattern on the substrate. At the step 242, the pre-pattern may be used to create a spacer layer for the growth guiding mechanism or template through ALD, PECVD, or any other deposition process for creating a conformal spacer layer. At the step 244, a selective etch (e.g., grazing angle etch) may be used to selectively remove the top of the spacer layer and underlying resists as shown in FIG. 13 and discussed herein in reference thereto. At a step 546, a gentle etch may be used to selectively remove the bottom of the spacer layer as also shown in FIG. 13 and discussed herein in reference thereto. The selective and gentles etches yield the growth guiding mechanism or template, which may be utilized in the step 170 for growing double density magnetic features including magnetic grains of the magnetic recording medium. Subsequent steps encompassed by the step 180 may yield the recording medium.

Figure 5B:
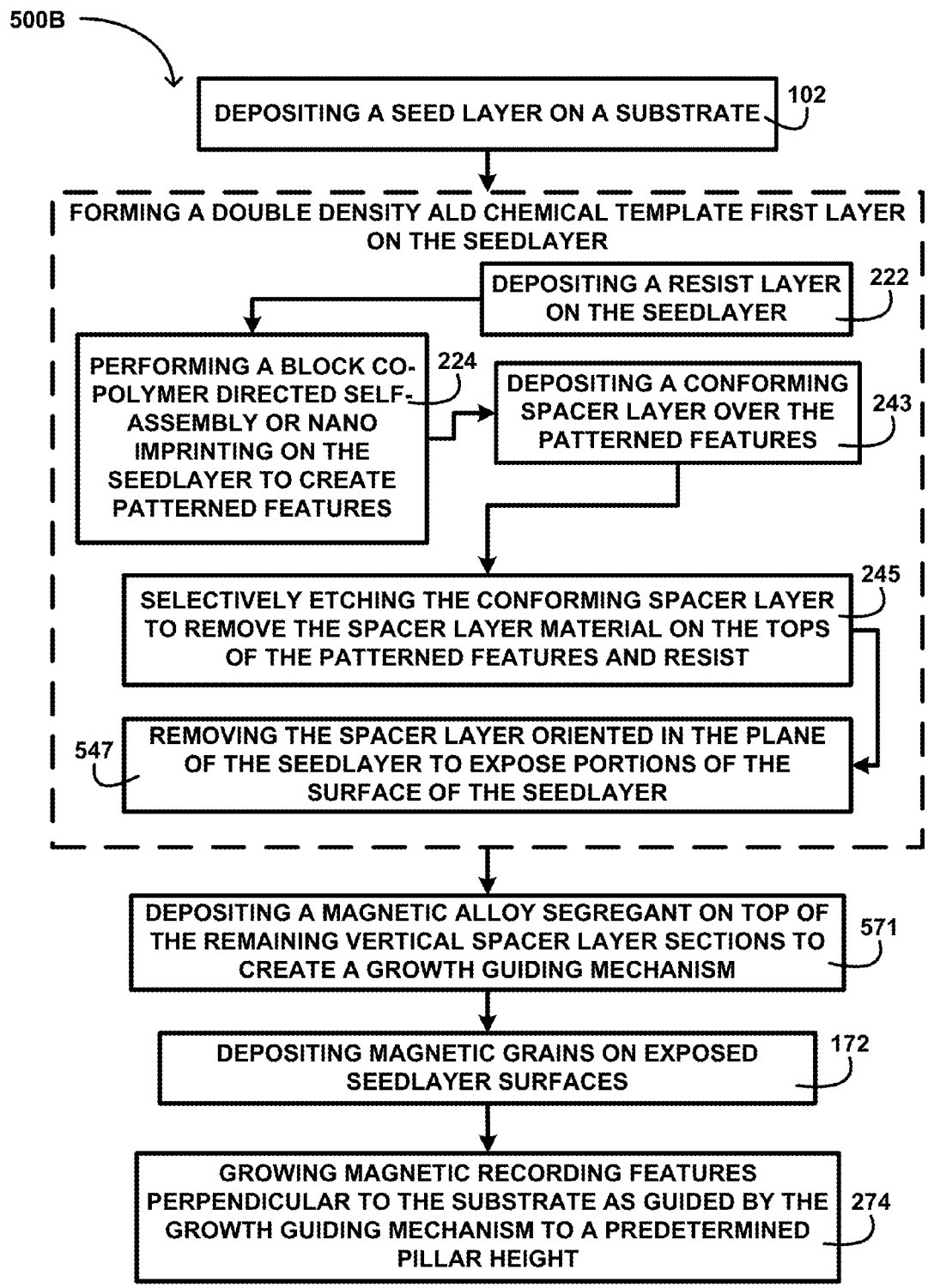
FIG. 5B shows a block diagram of an overview flow chart of fabricating patterned media using a double density ALD chemical template pre-patterned seedlayer in accordance with some embodiments.

FIG. 5B shows a block diagram of an overview flow chart of fabricating patterned media using a double density ALD chemical template pre-patterned seedlayer in accordance with some embodiments. FIG. 5B shows a process including depositing a seedlayer on a substrate at the step 102 and forming a double density ALD chemical template first layer on the seedlayer. A resist layer may be deposited on the seedlayer at the step 222, and a block co-polymer directed self-assembly or nano imprinting may be performed on the seedlayer to create patterned features at the step 224.

Processing includes depositing a conforming spacer layer over the patterned features at the step 243, and selectively etching the conforming spacer layer to remove the spacer layer material on the tops of the patterned features and resist at the step 245. The process continues with removing the spacer layer oriented in the plane of the seedlayer to expose portions of the surface of the seedlayer at a step 547. A process is used for creating a growth guiding mechanism in accordance with the double density ALD chemical template first layer. The processing includes depositing a magnetic alloy segregant on top of the remaining vertical spacer layer sections at a step 571. The processing includes depositing magnetic grains on exposed seedlayer surfaces at the step 172. The process includes growing magnetic recording features perpendicular to the substrate in the step 274 as guided by the growth guiding mechanism to a predetermined pillar height in accordance with some embodiments.

The growth guiding mechanism may be chemical. Metals stick well to metals but poorly to oxides, nitrides, carbides, borides, etc., while oxides for example stick well to oxides, but poorly to metals. The growth guiding mechanism include features to create a two-phase microstructure comprising a metal and a nonmetal which may be maintained during sputter film deposition on a coating of filler seed material in accordance with some embodiments.

The growth guiding mechanism may be physical. Metal grains nucleate in oriented fashion on a flat pillar region, but may be unable to do so in a very narrow trench. The nucleated metal grains form low profile (1-2 nm or less) BPM patterned guiding features. The formation includes a low profile etch process and a low profile deposition process in accordance with some embodiments.

Pillar and trench regions may be coated with materials having interface energies with the subsequently deposited material(s) that are very different. A spacer layer atomic layer deposition or PECVD is used for causing highly preferential "sticking" of subsequently deposited materials in a chemical pre-patterned media growth guiding mechanism in accordance with some embodiments.

A patterned deposition of a mask or resist layer is followed by a spacer layer atomic layer deposition or PECVD. A selective etch to remove sections of the spacer layer and patterned resist layer is used to create a pre-patterned growth guiding mechanism structure. The selective etch includes a grazing angle etch to remove the patterned resist and selectively remove the sections of the spacer layer on top of a patterned resist. A pre-patterned media growth guiding mechanism is deposited on the remaining spacer layer. The pre-patterned media growth guiding mechanism includes a deposited magnetic alloy segregant wherein a deposition of a magnetic alloy segregant includes an oxide material that deposits preferentially on the pre-patterned spacer layer material.

A deposition of a magnetic alloy includes metallic FePt-containing alloy grains deposited onto the exposed seedlayer surfaces. The metallic FePt-containing alloy grains stick preferentially to the pre-patterned seedlayer on some embodiments. Segregated growth of magnetic grains and magnetic alloy segregant enables growth of magnetic grains from the surface of and perpendicular to the seedlayer to a pre-determined height forming patterned magnetic recording features. The perpendicular growth of the magnetic grains includes features including steeper vertical side-walls on patterned features, accurate positioning of the pattern features, accurate control of the spacing between pattern features, uniform spacing between pattern features, prevention of damage from conventional after growth processes, and a thinner means for higher density and accurate patterning in accordance with some embodiments. The perpendicular growth of the magnetic grains includes features including improved intrinsic magnetic material properties of the post-patterning features, thermodynamic control to control pattern size, control of the composition profile of materials in the spacing between pattern features, reduced surface topography (roughness) of the post-patterning device, and uniformity of pattern size and aspect ratio at high density in accordance with some embodiments.

A typical layer structure of a perpendicular magnetic recording (PMR) media stack includes protective and lubricating layers, perpendicular magnetic (recording) layer(s), interlayer(s), soft underlayer(s) (SUL) and a substrate in accordance with some embodiments.

A typical layer structure of a heat assisted magnetic recording (HAMR) PMR media stack includes protective and lubricating layers, perpendicular magnetic (recording) layer(s), interlayer(s), thermal resistor (TR) layer(s), heatsink (HS) layer(s), soft underlayer(s) (SUL), and a substrate in accordance with some embodiments.

Examples of pre-patterned media growth process layers and materials include a seedlayer including titanium nitride (TiN), platinum (Pt), chromium alloys (CrX), magnesium oxide (MgO), or other seed materials in accordance with some embodiments. The pre-patterned media growth process layers and materials may include a resist layer including imprint resist, directed self-assembly resist, or other mask or resist materials in accordance with some embodiments.

The pre-patterned media growth process layers and materials include a spacer layer including oxides or metallic materials in accordance with some embodiments. The pre-patterned media growth process materials include a perpendicular magnetic (recording) material including a magnetic alloy including iron platinum (FePt) or other materials in accordance with some embodiments. The pre-patterned media growth process materials may further include a segregant material including carbon (C), silicon oxide ($SiO_2$), or other materials including oxides, nitrides, carbides, borides in accordance with some embodiments.

FIG. 6A shows for illustrative purposes only, a schematic for fabricating a recording medium through an ALD/PECVD template in accordance with some embodiments. As shown, the schematic begins with an apparatus 610 including a substrate (e.g., glass) including one or more underlayers (e.g., one or more soft underlayers) and a seedlayer (e.g., TiN, Pt, CrX, wherein X is a Cr-alloying element). In a process a, the apparatus 610 may be subjected to directed self-assembly, nanoimprint lithography, or a combination of directed self-assembly and nanoimprint lithography to create a pre-pattern (e.g., patterned resist) on an apparatus 620. In a process b, the apparatus 620 may be subjected to ALD, PECVD, or any other conformal deposition process to create a spacer layer (e.g., oxides) on the pre-pattern of an apparatus 630. In a process c, the apparatus 630 may be subjected to a selective etch (e.g., grazing angle etch) to selectively remove the top of the spacer layer and underlying resists, thereby creating the growth guiding mechanism or ALD/PECVD template as shown in FIG. 6A by an apparatus 640. In a process d, the apparatus 640 may be subjected to deposition of a magnetic alloy (e.g., FePt) and a magnetic alloy segregant (e.g., C, $SiO_2$) for growing magnetic features including magnetic grains of a magnetic recording medium. As shown by an apparatus 642, the deposition grows the magnetic features from the magnetic alloy on areas of exposed seedlayer (e.g., TiN, Pt, CrX, wherein X is a Cr-alloying element). As shown by an apparatus 650, the deposition separates the magnetic features from each other with the magnetic alloy segregant, which grows on the spacer (e.g., oxides) and established areas of the magnetic alloy segregate therebetween. It should be understood that the process d yields the apparatus 650, and the presentation of both the apparatus 642 and the apparatus 650 is for an illustrative purpose. In view of the foregoing, the growth guiding mechanism or ALD/PECVD template is configured to grow independent or isolated magnetic features for a magnetic recording medium.

Figure 6B:
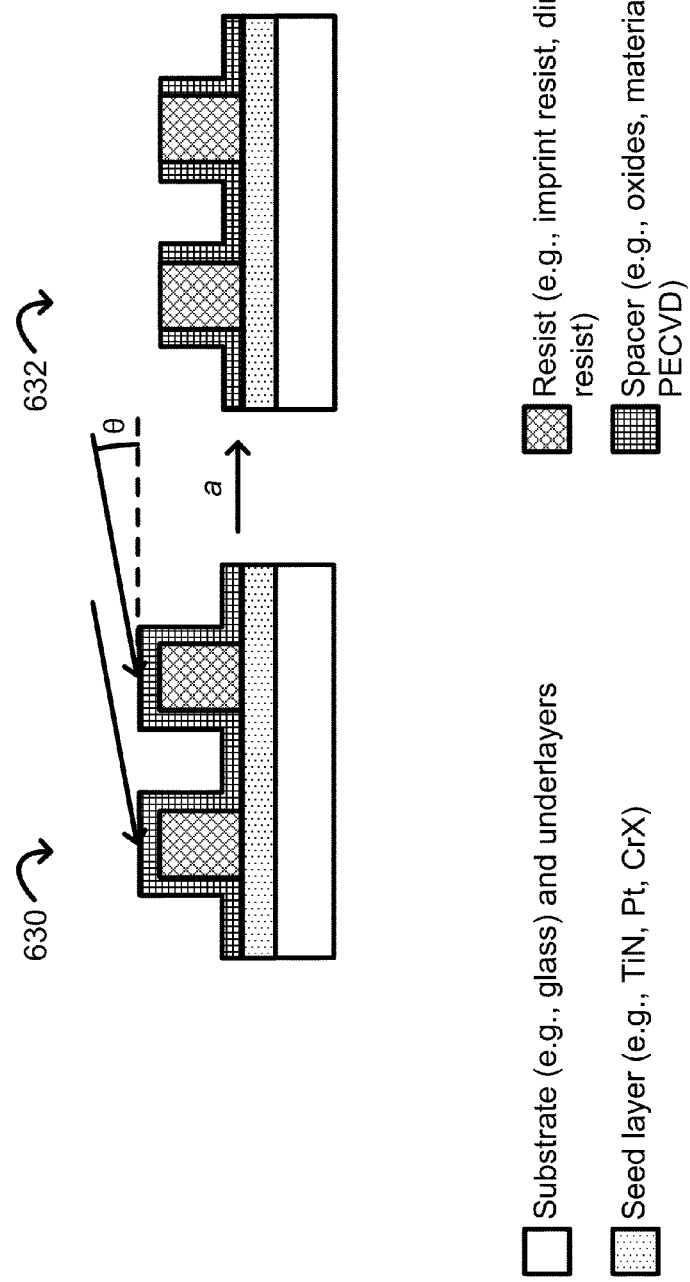
FIG. 6B shows for illustrative purposes only, an example of a process using a grazing angle etch in accordance with some embodiments.

FIG. 6B shows for illustrative purposes only, an example of a process using a grazing angle etch in accordance with some embodiments. Using the apparatus 630 as an example, the apparatus 630 may be subjected to a grazing angle etch to selectively remove the top of the spacer layer. As shown, the etch may be directional as indicated by the arrows leading from right of the sheet to left of the sheet, and the etch may be at a grazing angle θ, which grazing angle θ is the complement of the angle of angle of incidence defined by a normal to the spacer layer. As shown, the grazing angle etch selectively removes at least the top of the spacer layer to yield an apparatus 632.

Figure 7A:
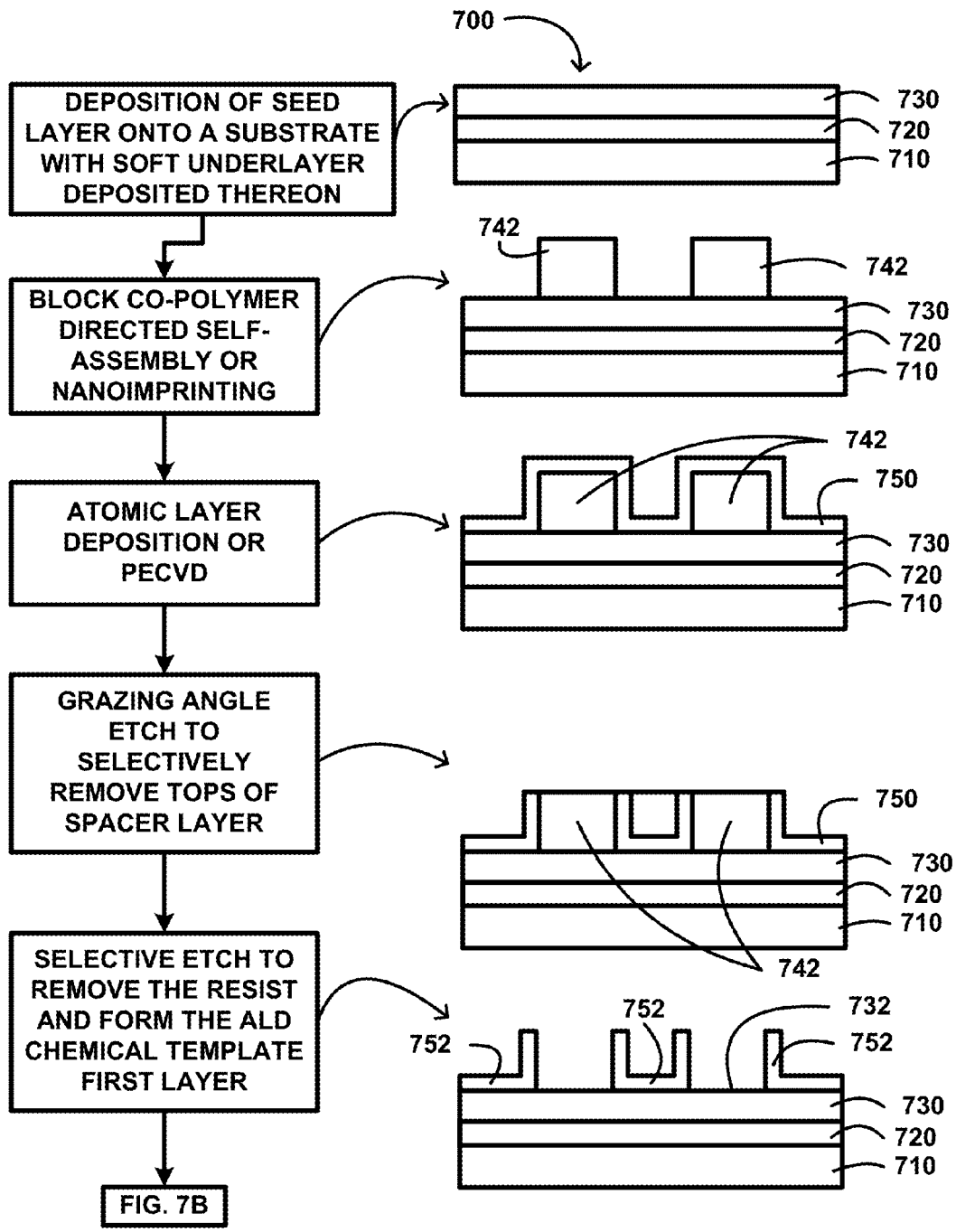
FIG. 7A shows for illustrative purposes only, an example of a pre-patterned media growth process using an ALD chemical template in accordance with some embodiments.

FIG. 7A shows for illustrative purposes only, an example of a pre-patterned media growth process using an ALD chemical template in accordance with some embodiments. FIG. 7A shows a pre-patterned media growth process using an ALD chemical template including deposition of a seedlayer 730 onto a substrate 710 with a soft underlayer 720 deposited thereon. A structure 700 includes the substrate 710, soft underlayer (SUL) 720, and the seedlayer 730.

A resist layer is deposited on the seedlayer 730. A block co-polymer directed self-assembly or nanoimprinting is performed in the resist layer to form patterned resist features 742. An atomic layer deposition or PECVD is used to deposit a conforming spacer layer 750 that conforms to the patterned resist features 742. A grazing angle etch may be used to selectively remove tops of spacer layer 750 on the top surfaces of the patterned resist features 742. A grazing angle etch does not remove other sections of the spacer layer 750. Spacer layer etched sections 752 surround the previously present patterned resist features. A selective etch to remove the remainder of the resist 680 is performed, thereby clearing exposed seedlayer surfaces 732 without affecting the substrate 710 and soft underlayer (SUL) 720 in accordance with some embodiments. The process is further described in FIG. 7B.

Figure 7B:
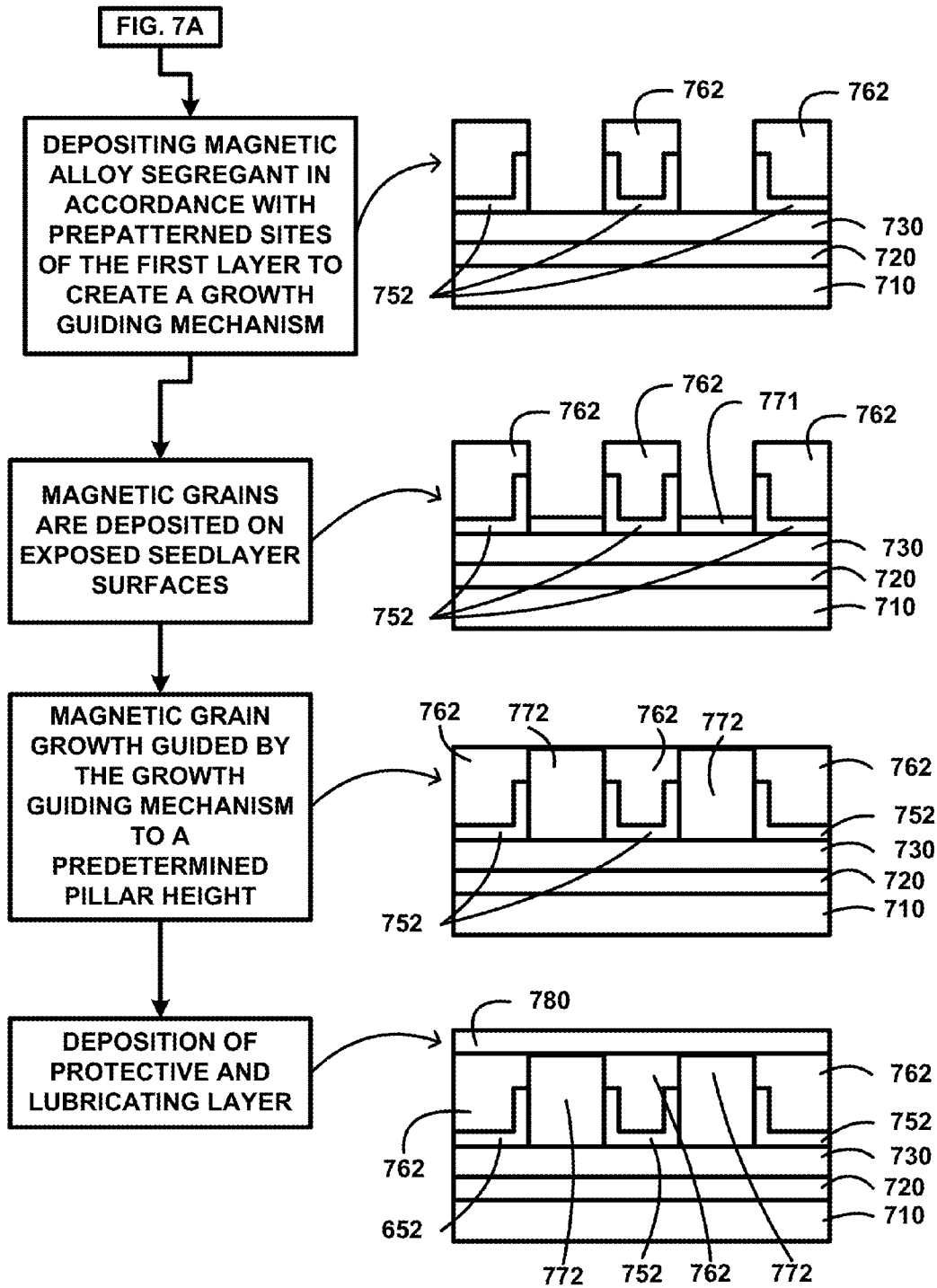
FIG. 7B shows for illustrative purposes only, an example of a growth guiding mechanism in accordance with some embodiments.

FIG. 7B shows for illustrative purposes only, an example of a growth guiding mechanism in accordance with some embodiments. FIG. 7B shows a continuation from FIG. 7A including depositing magnetic alloy and segregant in accordance with pre-patterned sites. The deposited magnetic alloy segregant 762 on top of the remaining spacer layer etched sections 752 forms cylinders, square islands and other 3-D features that includes exposed surfaces of the seedlayer on the substrate 710, soft underlayer (SUL) 720, and seedlayer 730 structure. Magnetic grains are deposited on exposed seedlayer surfaces 732 (see FIG. 7A) where the exposed seedlayer surfaces 732 promote growth of nascent magnetic grains 771. Magnetic grain growth is guided by the growth guiding mechanism to a predetermined pillar height concurrently with the magnetic alloy segregant. The magnetic alloy segregant 762 inhibits magnetic grain growth thereby guiding vertical growth of the magnetic grains 772 perpendicular to the substrate, wherein the magnetic grains 772 grow with vertical sides to a predetermined pillar height. When the growth is complete, a deposition of protective and lubricating layers 780 is made. The protective and lubricating layers 780 protect the top surfaces of the magnetic grains or recording features 772 and the magnetic alloy segregant 762 in accordance with some embodiments.

Figure 8A:
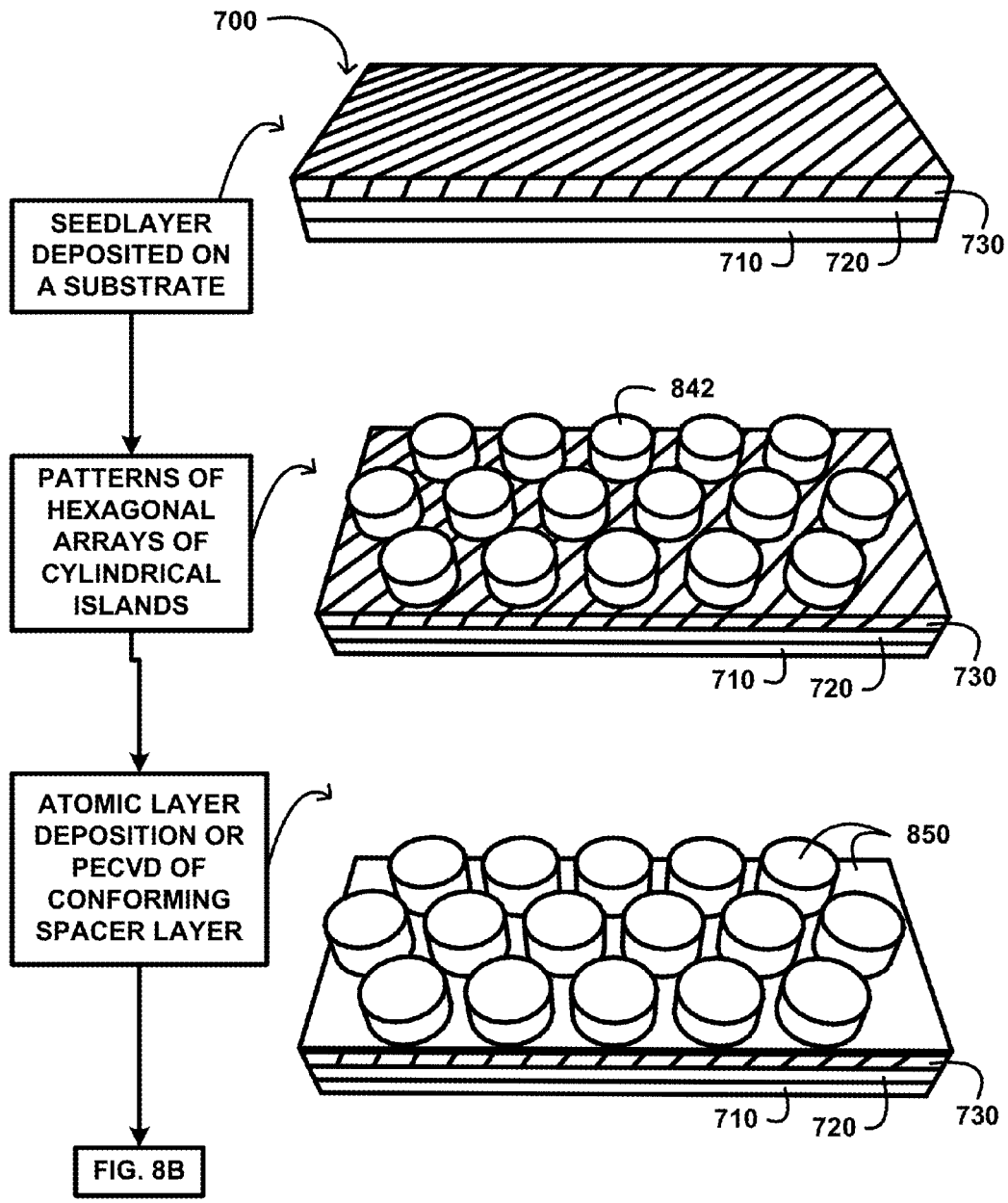
FIG. 8A shows for illustrative purposes only, an example of pre-patterned media growth process using an ALD chemical template on hexagonal arrays of cylindrical islands in accordance with some embodiments.

FIG. 8A shows for illustrative purposes only, an example of pre-patterned media growth process using an ALD chemical template on hexagonal arrays of cylindrical islands in accordance with some embodiments. FIG. 8A shows a pre-patterned media growth process using an ALD chemical template. The structure 700 includes a substrate 710 with a soft underlayer (SUL) 720 and a seedlayer 730 deposited thereon. The process includes patterning hexagonal arrays of cylindrical islands 842 from resist on the seedlayer 730. The processing includes an atomic layer deposition or PECVD of conforming spacer layer 850 where the spacer layer 850 is conforming to the hexagonal arrays of cylindrical islands 842 and the seedlayer 850 in accordance with some embodiments. Descriptions of the processing continue in FIG. 8B.

Figure 8B:
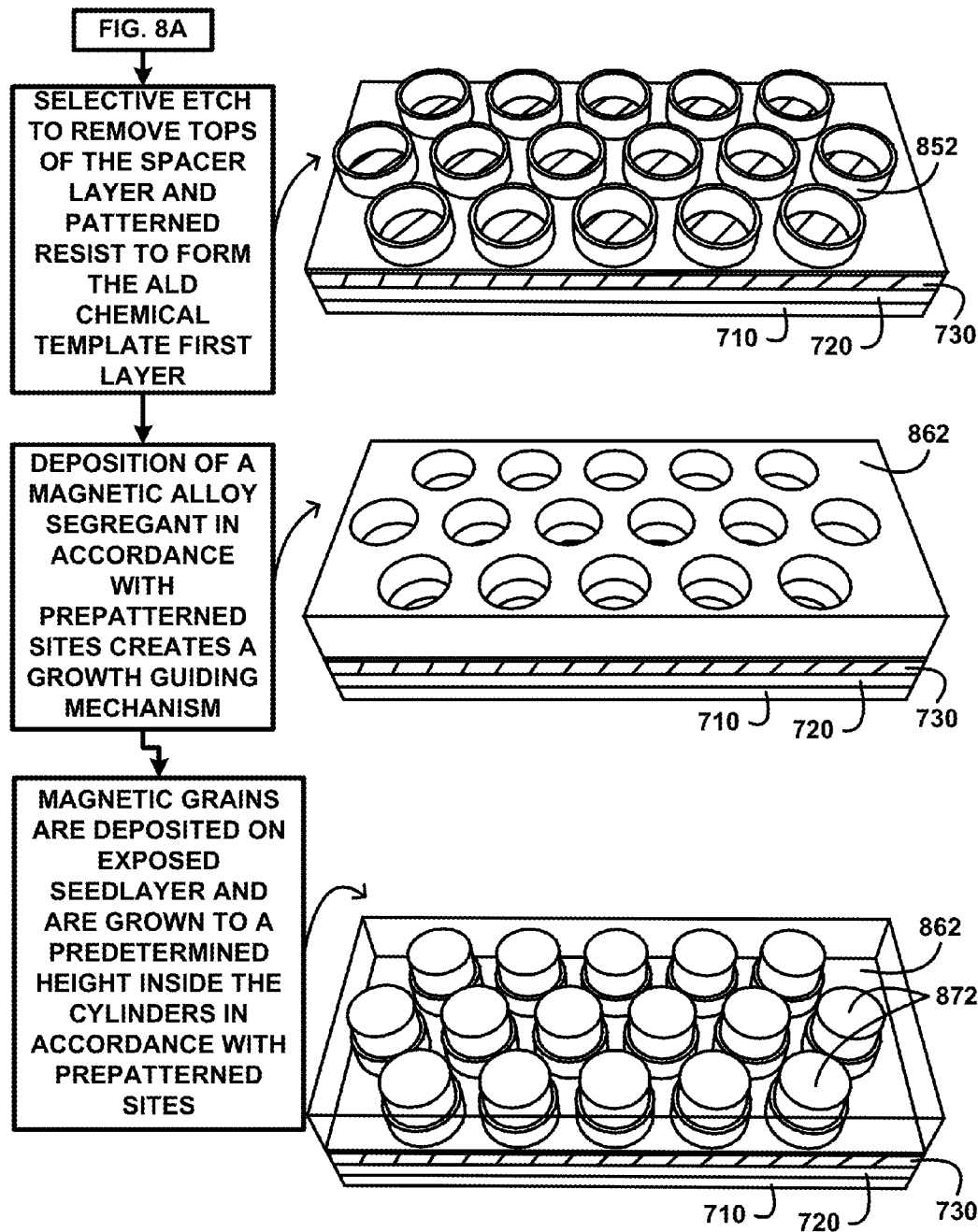
FIG. 8B shows for illustrative purposes only, an example of magnetic BPM grain growth at pre-patterned sites from the bottom up in accordance with some embodiments.

FIG. 8B shows for illustrative purposes only, an example of magnetic BPM grain growth at pre-patterned sites from the bottom up in accordance with some embodiments. FIG. 8B shows continuing from FIG. 8A, a selective etch to remove tops of the spacer layer 850 and patterned resist (e.g., hexagonal arrays of cylindrical islands 842 from resist). The selective etch does not affect the substrate 710, soft underlayer (SUL) 720, and seedlayer 730. Pre-patterned sections of the seedlayer 730 are exposed with the removal of the resist. A deposition of a magnetic alloy 872 and segregant 862 in accordance with pre-patterned sites is made.

The magnetic alloy segregant 862 is shown transparent for illustration purposes only to allow visualization of the magnetic grain growth. Magnetic grains 872 are deposited on exposed seedlayer and are separated by the segregant 862 in accordance with pre-patterned sites is processed. Magnetic grains growth to a predetermined pillar height is guided by the growth guiding mechanism. The magnetic grains grown form magnetic recording features with vertical sides and perpendicular to the substrate in accordance with some embodiments.

FIG. 9 shows for illustrative purposes only, a schematic for fabricating a recording medium through a modified chemical template in accordance with some embodiments. As shown, the schematic begins with the apparatus 610 including a substrate (e.g., glass) including one or more underlayers (e.g., one or more soft underlayers) and a seedlayer (e.g., TiN, Pt, CrX, wherein X is a Cr-alloying element). In the process a, the apparatus 610 may be subjected to directed self-assembly, nanoimprint lithography, or a combination of directed self-assembly and nanoimprint lithography to create a pre-pattern (e.g., patterned resist) on the apparatus 620. In a process b, exposed areas of the seedlayer of the apparatus 620 may be selectively oxidized (e.g., directional oxygen plasma) to yield an apparatus 930. In a process c, resists may be removed, thereby creating the growth guiding mechanism or modified chemical template as shown in FIG. 9 by an apparatus 940. In a process d, the apparatus 940 may be subjected to deposition of a magnetic alloy (e.g., FePt) for growing magnetic features including magnetic grains of a magnetic recording medium. As shown by an apparatus 950, the magnetic features preferentially grow on the non-oxidized areas of the seedlayer. While not shown in FIG. 9, the deposition may include a magnetic alloy segregant to isolate the magnetic features as described herein. The magnetic alloy segregant preferentially grows on the oxidized areas of the seedlayer to isolate the magnetic features. In view of the foregoing, the growth guiding mechanism or modified chemical template is configured to grow independent or isolated magnetic features for a magnetic recording medium.

Figure 10:
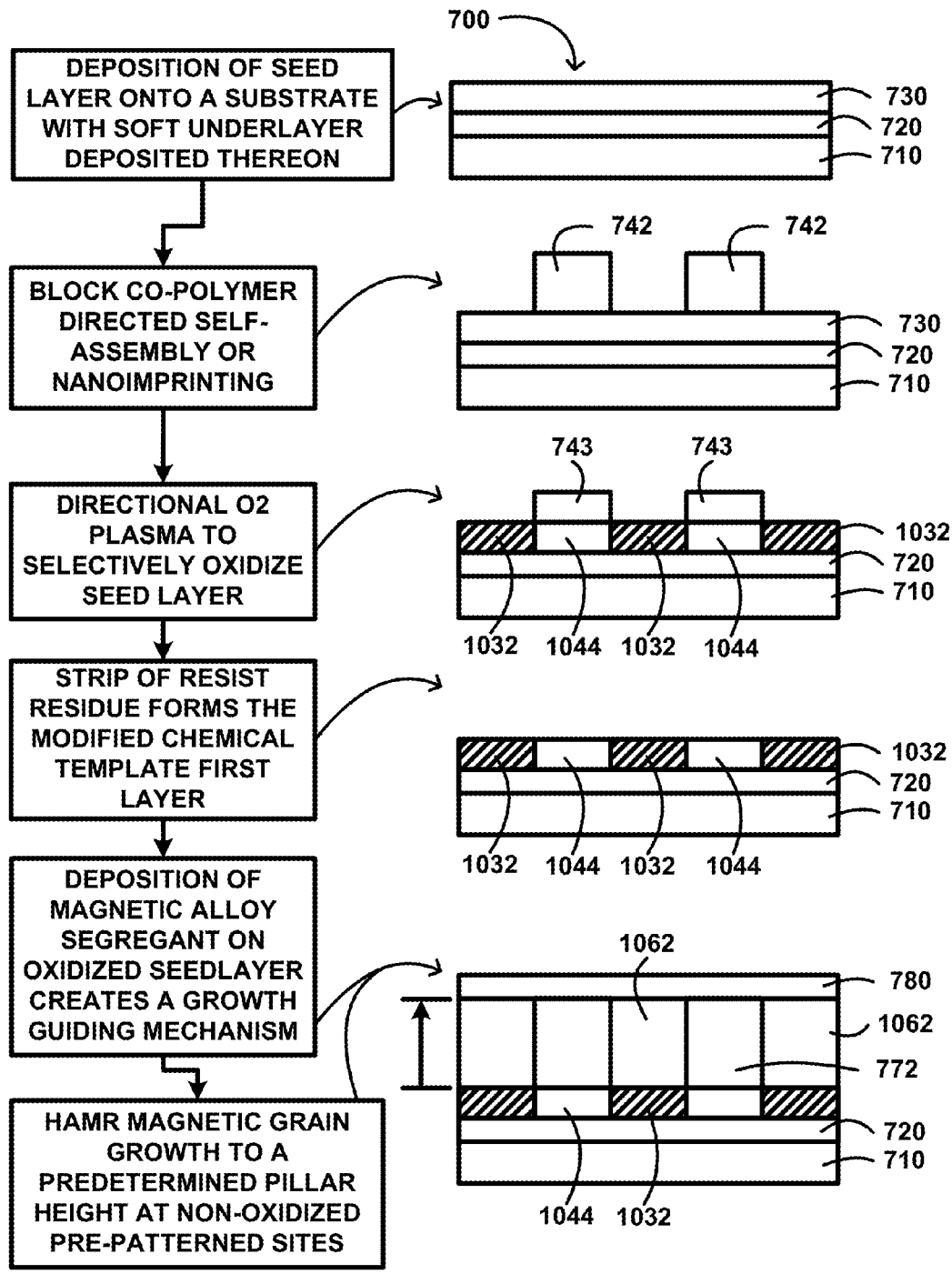
FIG. 10 shows for illustrative purposes only, an example of a pre-patterned media growth process using a modified chemical template in accordance with some embodiments.

FIG. 10 shows for illustrative purposes only, an example of a pre-patterned media growth process using a modified chemical template in accordance with some embodiments. FIG. 10 shows a pre-patterned media growth process using a modified chemical template. The process includes the deposition of seedlayer 730 onto a substrate 710 with soft underlayer 720 deposited thereon yielding structure 700. A resist layer is deposited on the seedlayer 730 using block co-polymer directed self-assembly or nanoimprinting, forming patterned resist features 742. A directional oxygen plasma may be used to selectively oxidize seedlayer 730 to transfer the resist pattern into the seedlayer 730 at oxidized seedlayer sections 1032. The oxidation process reduces the height of the patterned resist features 742 yielding low-profile patterned resist features 743. A process is used to perform a strip of resist residue, thereby exposing non-oxidized patterned section of the seedlayer 1044.

The transfer of the resist pattern produces a pattern including oxidized sections of the seedlayer 1032 and non-oxidized patterned section of the seedlayer 1044. A deposition of magnetic alloy and segregant on oxidized sections of the seedlayer 1032 and the non-oxidized patterned section of the seedlayer 1044 is made. A deposition of magnetic grains 772 is made on each non-oxidized patterned section of the seedlayer, and a deposition of segregant 1062 is made on the oxidized sections of the seedlayer 1032. The pre-patterned media growth process modified chemical template growth guiding mechanism promotes HAMR magnetic grain growth to a predetermined pillar height at non-oxidized pre-patterned sites. Thereafter protective and lubricating layers 780 are deposited on the top surfaces of the magnetic grains 772 and magnetic alloy segregant 1062 in accordance with some embodiments.

FIG. 11 shows for illustrative purposes only, a schematic for fabricating a recording medium through a topographical template in accordance with some embodiments. As shown, the schematic begins with the apparatus 610 including a substrate (e.g., glass) including one or more underlayers (e.g., one or more soft underlayers) and a seedlayer (e.g., TiN, Pt, CrX, wherein X is a Cr-alloying element). In the process a, the apparatus X1000 may be subjected to directed self-assembly, nanoimprint lithography, or a combination of directed self-assembly and nanoimprint lithography to create a pre-pattern (e.g., patterned resist) on an apparatus X1002. In a process b, the seedlayer of the apparatus 620 may be etched, and the resists on the seedlayer removed, thereby creating the growth guiding mechanism or topographical template as shown in FIG. 11 by an apparatus 1130. In a process c, the apparatus 1130 may be subjected to deposition of a magnetic alloy (e.g., FePt) and a magnetic alloy segregant (e.g., C, SiO$_2$) for growing magnetic features including magnetic grains of the magnetic recording medium. As shown by an apparatus 1140, the deposition grows the magnetic features from the magnetic alloy on major areas of the seedlayer (e.g., TiN, Pt, CrX, wherein X is a Cr-alloying element), and the magnetic alloy segregant grows in minor areas (e.g., trenches) to separate the magnetic features from each other. In view of the foregoing, the growth guiding mechanism or topographical template is configured to grow independent or isolated magnetic features for a magnetic recording medium.

Figure 12:
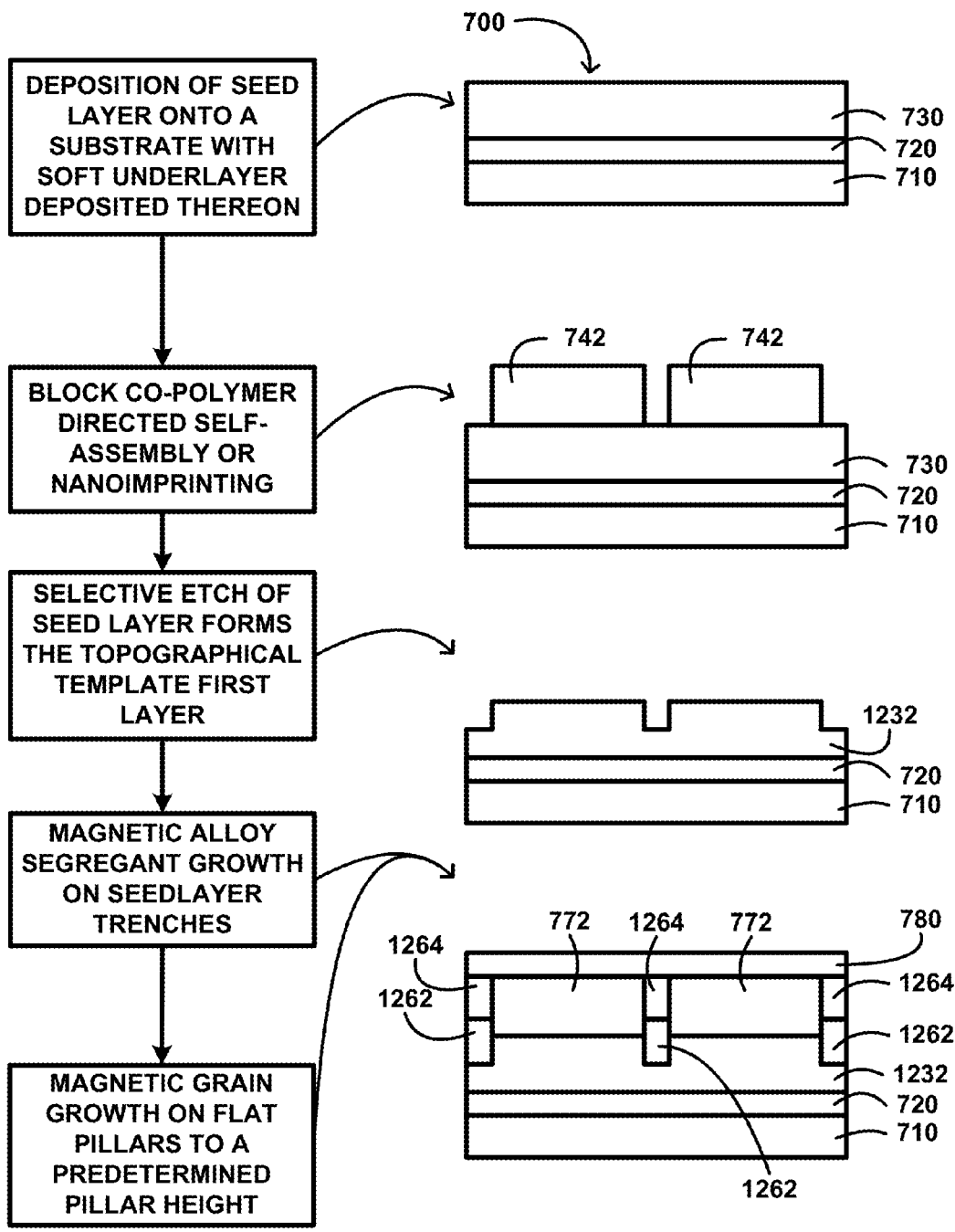
FIG. 12 shows for illustrative purposes only, an example of a pre-patterned media growth process using a topographical template in accordance with some embodiments.

FIG. 12 shows for illustrative purposes only, an example of a pre-patterned media growth process using a topographical template in accordance with some embodiments. FIG. 12 shows a pre-patterned media growth process using a topographical template including a structure 700 with a deposition of seedlayer 730 onto a substrate 710 with soft underlayer 730 deposited thereon. A resist deposition is made on the seedlayer 730 by block co-polymer directed self-assembly or nanoimprinting to create a patterned resist layer 742 (e.g., for bit-patterned media (BPM)).

A selective etch of seedlayer 730 is processed to create a patterned seedlayer 1232. A deposition of a magnetic alloy and segregant is made to allow magnetic alloy and segregant growth on the patterned seedlayer 1232, wherein the magnetic alloy including magnetic grains 772 is deposited on the tops of the patterned seedlayer 1232 to promote magnetic grain growth on flat pillars, and wherein the segregant 1262 grows in trenches of the patterned seedlayer 1232 inhibiting magnetic grain growth therein. Optionally, a low thermal conductive filler 1264 may be used to further fill in the trenches of the patterned seed layer 1232. The magnetic grains 772 grow to a predetermined pillar height as guided by the growth guiding mechanism. Protective and lubricating layers 780 are deposited on top of the magnetic grains 772 and the segregant 1262 or low thermal conductive filler 1264 in accordance with some embodiments.

FIG. 13 shows for illustrative purposes only, a schematic for fabricating a recording medium through an ALD/PECVD template in accordance with some embodiments. As shown, the schematic begins with the apparatus 610 including a substrate (e.g., glass) including one or more underlayers (e.g., one or more soft underlayers) and a seedlayer (e.g., TiN, Pt, CrX, wherein X is a Cr-alloying element). In the process a, the apparatus 610 may be subjected to directed self-assembly, nanoimprint lithography, or a combination of directed self-assembly and nanoimprint lithography to create a pre-pattern (e.g., patterned resist) on the apparatus 620. In the process b, the apparatus 620 may be subjected to ALD, PECVD, or any other conformal deposition process to create a spacer layer (e.g., oxides) on the pre-pattern of the apparatus 630. In the process c, the apparatus 630 may be subjected to a selective etch (e.g., grazing angle etch) to selectively remove the top of the spacer layer and underlying resists to yield the apparatus 640. In a process d, the apparatus 640 may be subjected to a gentle etch to selectively remove the bottom of the spacer layer leaving the sidewalls of the spacer layer, thereby creating the growth guiding mechanism or ALD/PECVD template (e.g., double density ALD/PECVD template) as shown in FIG. 13 by an apparatus 1350. In a process e, the apparatus 1350 may be subjected to deposition of a magnetic alloy (e.g., FePt) and a magnetic alloy segregant (e.g., C, $SiO_2$) for growing magnetic features including magnetic grains of a magnetic recording medium. As shown by an apparatus 1360, the deposition grows the magnetic features (e.g., double density magnetic features) from the magnetic alloy on areas of exposed seedlayer (e.g., TiN, Pt, CrX, wherein X is a Cr-alloying element). The deposition separates the magnetic features from each other with the magnetic alloy segregant, which grows on the spacer (e.g., oxides) and established areas of the magnetic alloy segregate therebetween. In view of the foregoing, the growth guiding mechanism or ALD/PECVD template (e.g., double density ALD/PECVD template) is configured to grow independent or isolated magnetic features for a magnetic recording medium.

Figure 14A:
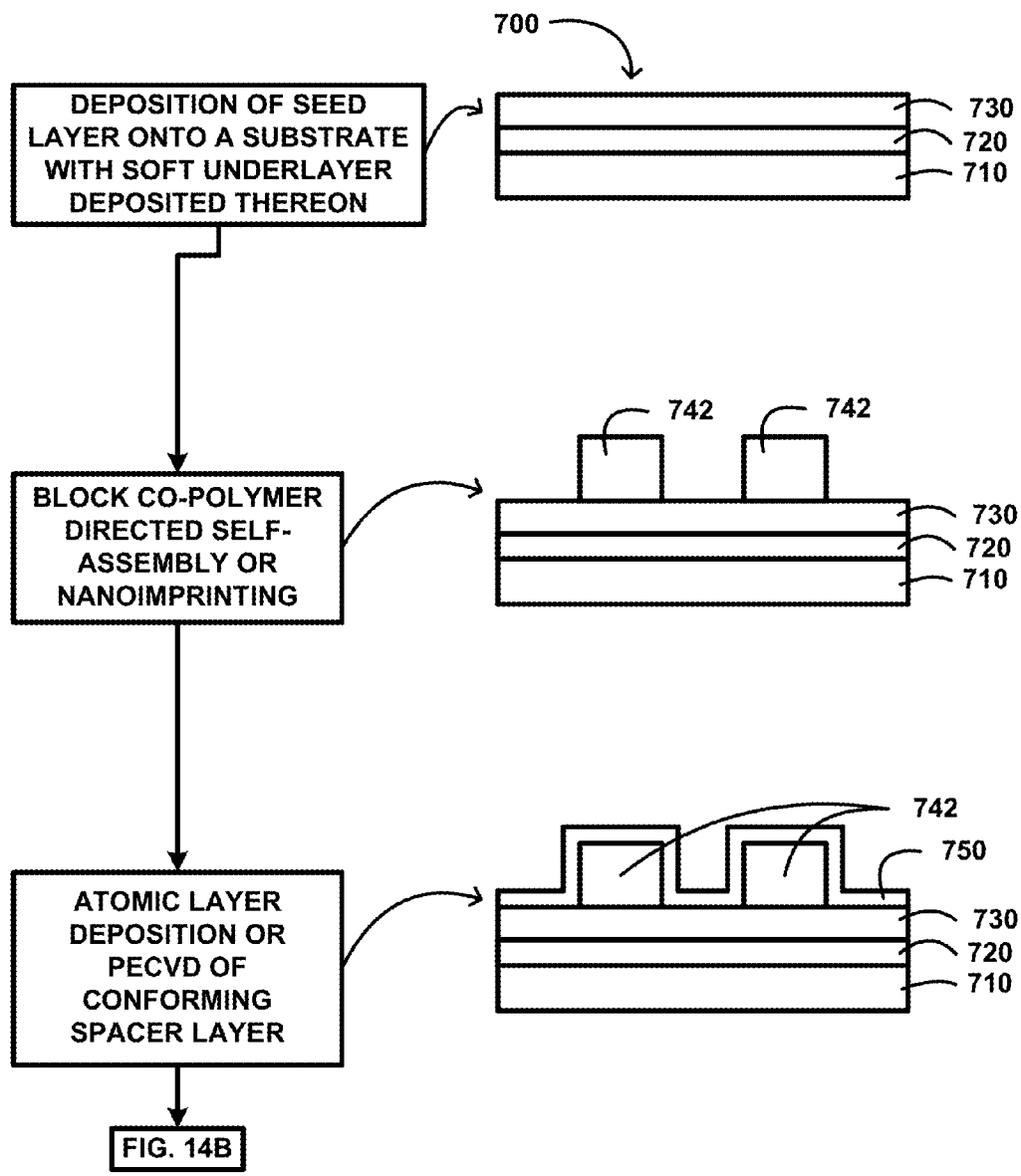
FIG. 14A shows for illustrative purposes only, an example of a pre-patterned media growth process using a double density ALD chemical template in accordance with some embodiments.

FIG. 14A shows for illustrative purposes only, an example of a pre-patterned media growth process using a double density ALD chemical template in accordance with some embodiments. FIG. 14A shows a pre-patterned media growth process using a double density ALD chemical template 1100. The process includes a structure 700 with the deposition of seedlayer 730 onto a substrate 710 with soft underlayer 720 deposited thereon. A resist layer is deposited on the seedlayer 730 by block co-polymer directed self-assembly or nanoimprinting to pattern the resist layer to form patterned resist features 742. An atomic layer deposition or PECVD of conforming spacer layer 750, wherein the spacer layer 750 conforms to the patterned resist features 742 in accordance with some embodiments. The processing continues in FIG. 14B.

Figure 14B:
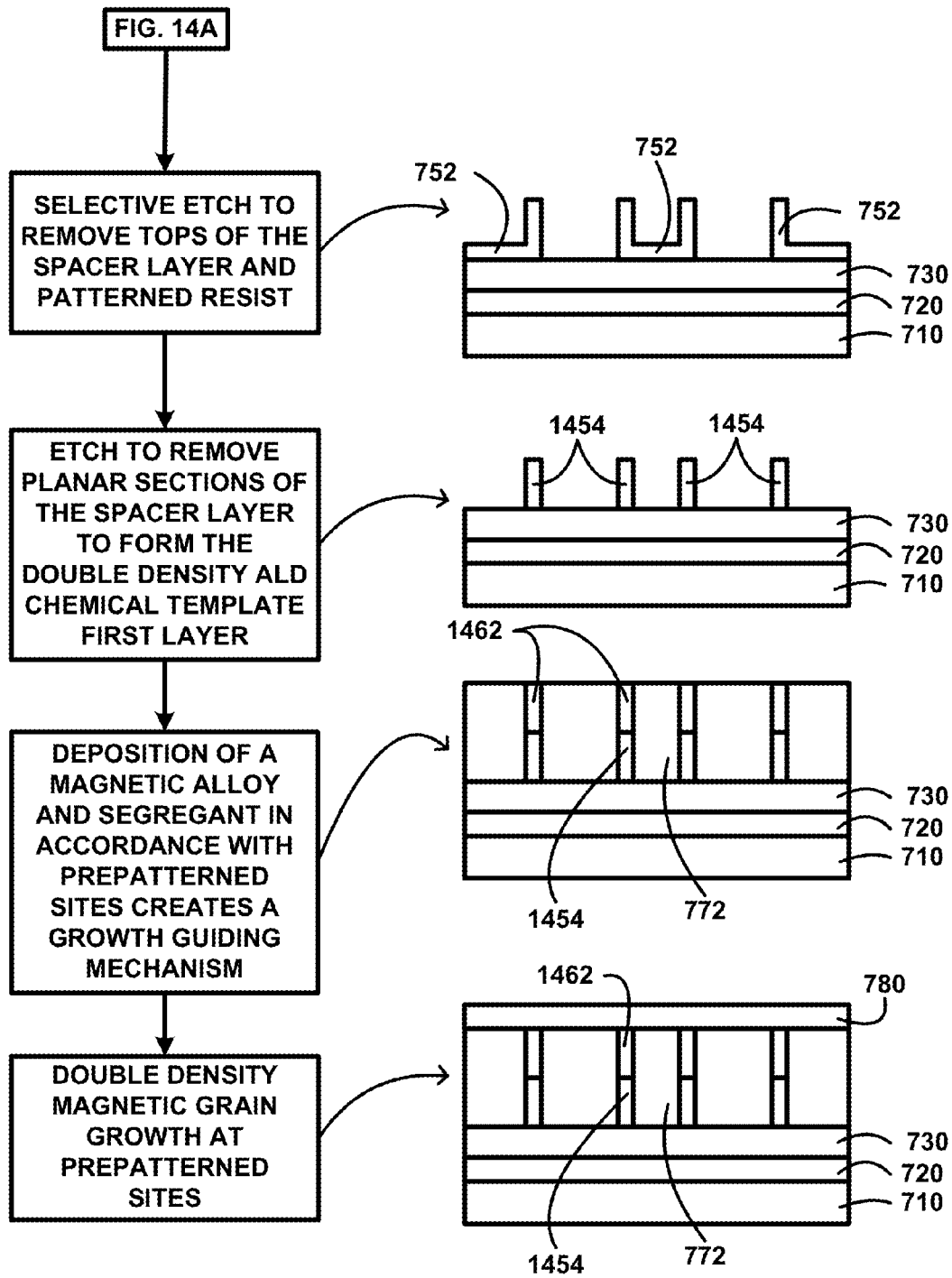
FIG. 14B shows for illustrative purposes only, an example of double density magnetic grain growth at pre-patterned sites in accordance with some embodiments.

FIG. 14B shows for illustrative purposes only an example of double density magnetic grain growth at pre-patterned sites in accordance with some embodiments. FIG. 14B shows continuing from FIG. 14A the selective etch to remove tops of the spacer layer 750 and patterned resist 742. The spacer layer etched sections 752 is on top of the seedlayer 730 deposited on the substrate 710 with the soft underlayer (SUL) 720 deposited thereon. A process is used including an etch to remove planar sections of the spacer layer etched sections 752 leaving etched vertical sections of the spacer layer 1454. Deposition of a magnetic alloy and segregant in accordance with prepatterned sites creates a growth guiding mechanism. The guiding growth mechanism guides magnetic alloy segregant onto etched vertical sections of the spacer layer 1454 and guides the magnetic alloy onto exposed surfaces of the seedlayer 730 for magnetic grains growth perpendicular to the seedlayer and to a predetermined pillar height.

As such, grains of the magnetic alloy 772 are deposited on the exposed surfaces of the seedlayer (e.g., pre-patterned sites) and grow to a predetermined pillar height, and the grains of the magnetic alloy 772 are separated by the magnetic alloy segregant 1462. Double density magnetic grain growth at pre-patterned sites takes place where the density is double that of patterned wherein the planar sections of the planar sections of the spacer layer have not been removed. Protective and lubricating layers 180 are deposited to protect the top surfaces in accordance with some embodiments.

Figure 15A:
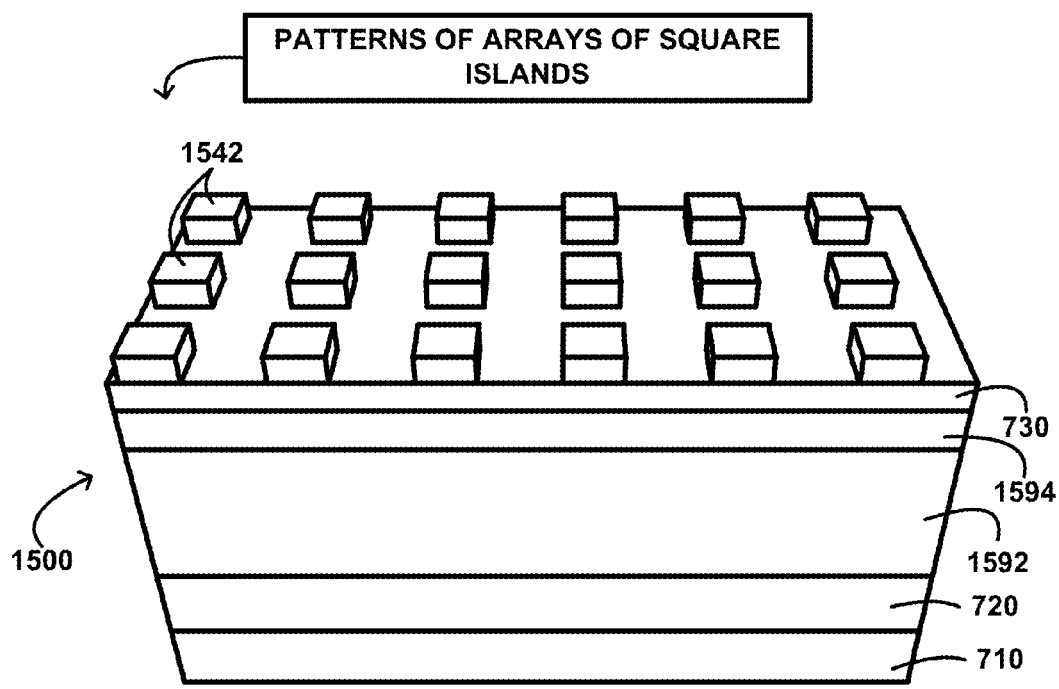
FIG. 15A shows for illustrative purposes only, an example of bit patterns on arrays of square islands in accordance with some embodiments.

FIG. 15A shows for illustrative purposes only, an example of arrays of square islands in accordance with some embodiments. The predetermined pillar height includes the height of cuboids formed from square and/or rectangular shaped patterns. The cuboid magnetic features are herein referred to as squares and/or square islands. Growing the magnetic grains perpendicular to the seedlayer includes growing grains inside the square islands. The boundaries of the square islands are defined by the growth guiding mechanism in accordance with the pre-patterned seedlayer.

FIG. 15A shows a first structure 1500 in accordance with a pre-patterned media growth process using a double density ALD chemical template used for arrays of square islands 1542. A portion of typical HAMR PMR media stack structure is shown including layers listed from the base with subsequent layers deposited on top of the preceding layer including a substrate 710, soft underlayer (SUL) 720, heatsink (HS) layer 1592, thermal resistor (TR) layer 1594, and a seedlayer 730. A resist layer is deposited on the seedlayer 730, wherein processing is used to create a resist layer patterned in arrays of square islands 1542 in accordance with some embodiments.

Figure 15B:
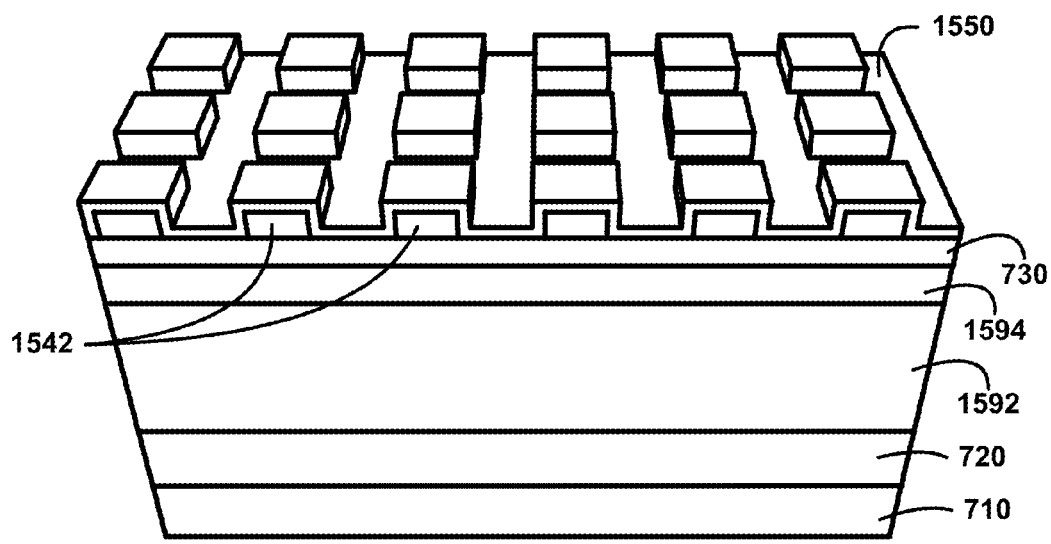
FIG. 15B shows for illustrative purposes only, an example of a resist layer patterned in arrays of square islands in accordance with some embodiments.

FIG. 15B shows for illustrative purposes only, an example of resist layer patterned in arrays of square islands in accordance with some embodiments. FIG. 15B shows the substrate 710, soft underlayer (SUL) 720, heatsink (HS) layer 1592, thermal resistor (TR) layer 1594, seedlayer 730 and resist layer patterned in arrays of square islands 1542 with a conforming deposition to form the spacer layer 1550 conforming to the arrays of square islands in accordance with some embodiments.

Figure 15C:
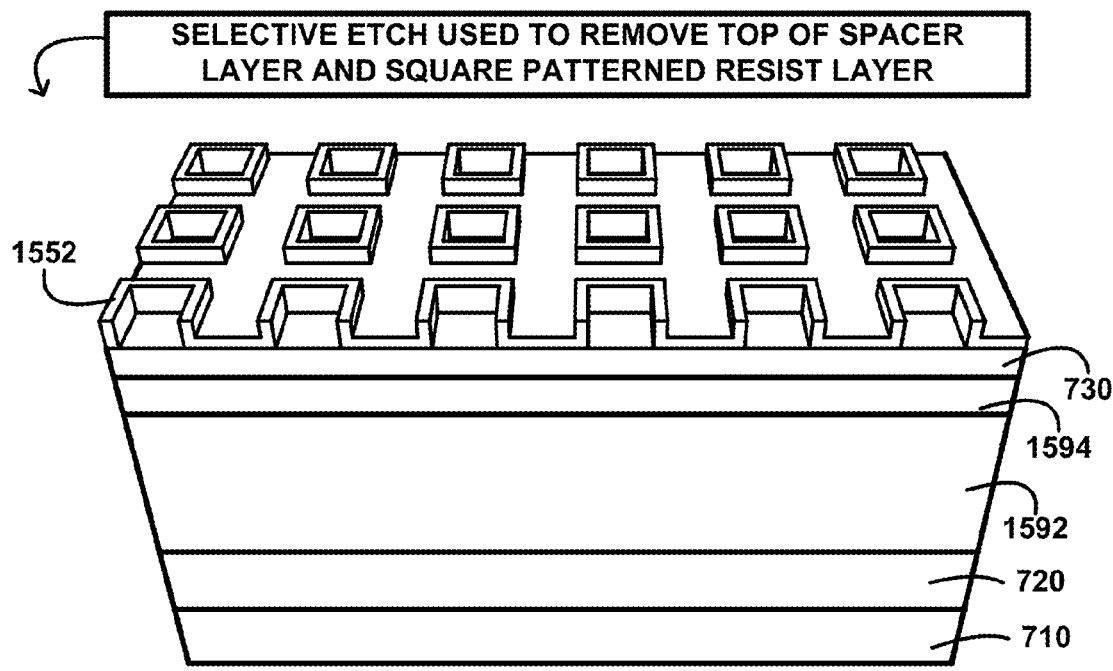
FIG. 15C shows for illustrative purposes only, an example of an etched patterned spacer layer in arrays of square islands in accordance with some embodiments.

FIG. 15C shows for illustrative purposes only, an example of etched patterned spacer layer in arrays of square islands in accordance with some embodiments. FIG. 15C shows how a selective etch removes a top of the spacer layer 1550 and the resist layer patterned in arrays of square islands 1542, yielding etched patterned spacer layer 1552 having planar sections of the spacer layer in accordance with some embodiments.

Figure 15D:
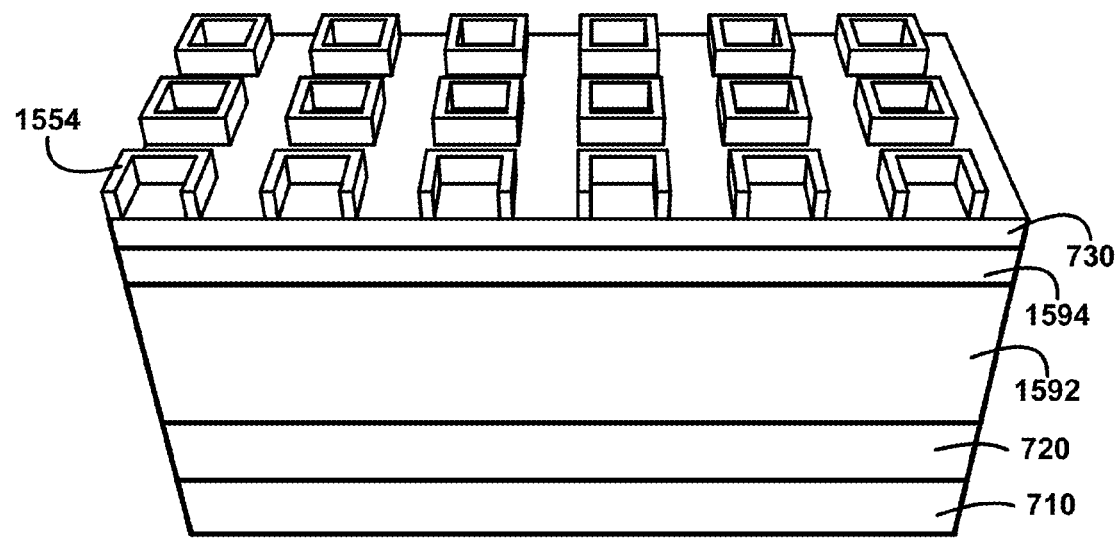
FIG. 15D shows for illustrative purposes only, an example of an etch to remove planar sections of the spacer layer in accordance with some embodiments.

FIG. 15D shows for illustrative purposes only, an example of etch to remove planar sections of the spacer layer in accordance with some embodiments. FIG. 15D shows the substrate 710, soft underlayer (SUL) 720, heatsink (HS) layer 1592, thermal resistor (TR) layer 1594, seedlayer 730, and etched patterned spacer layer 1554 having vertical sections of the spacer layer. A process is used wherein planar sections of the spacer layer are removed to expose the seedlayer 730 in accordance with some embodiments.

Figure 15E:
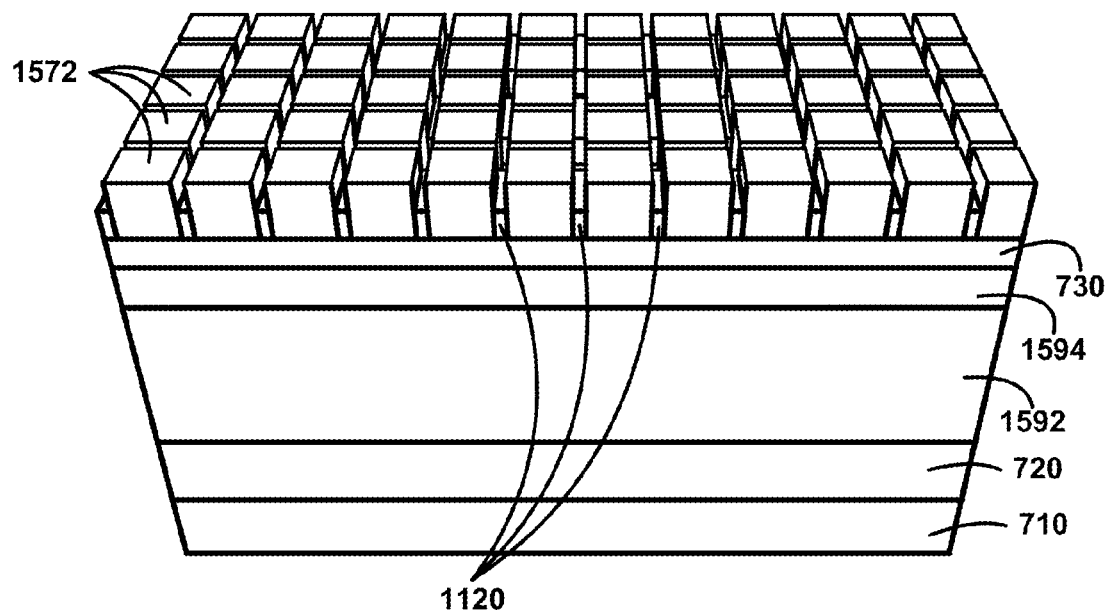
FIG. 15E shows for illustrative purposes only, an example of double density magnetic grain growth at pre-patterned sites in accordance with some embodiments.

FIG. 15E shows for illustrative purposes only, an example of double density magnetic grain growth at pre-patterned sites in accordance with some embodiments. FIG. 15E shows the substrate 710, soft underlayer (SUL) 720, heatsink (HS) layer 1592, thermal resistor (TR) layer 1594, seedlayer 730 and etched patterned spacer layer 1554 having vertical sections of the spacer layer. A deposition of grains of the magnetic alloy is made to allow magnetic grain growth in square islands 1572 on exposed sections of the seedlayer 730 in accordance with some embodiments.

Figure 15F:
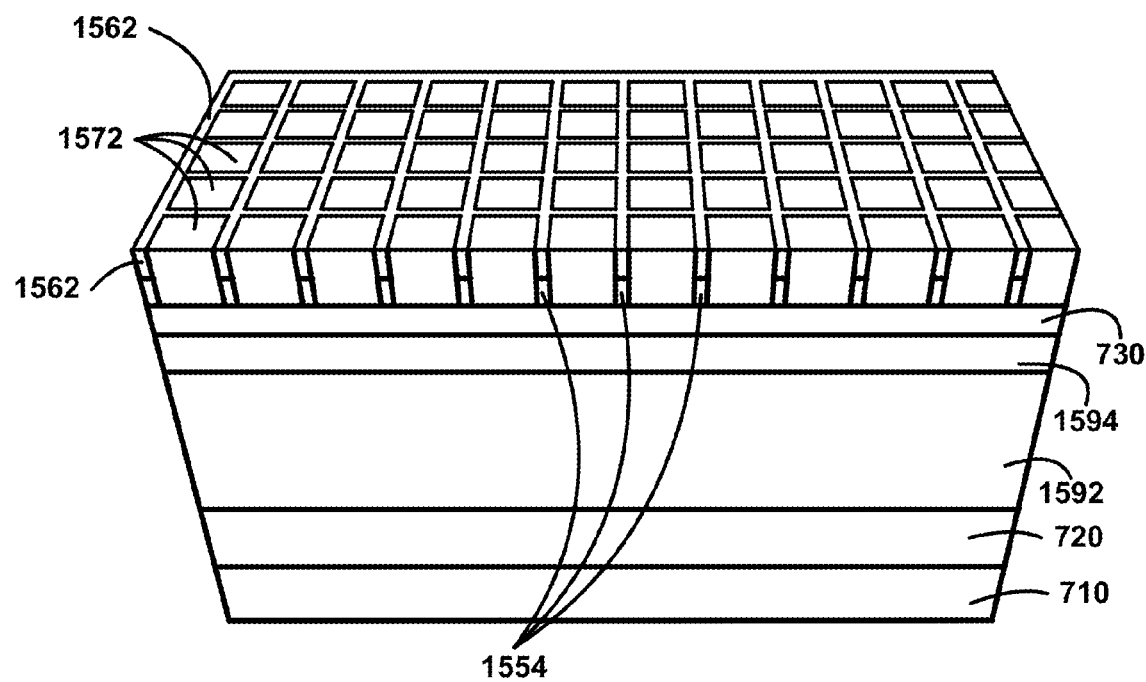
FIG. 15F shows for illustrative purposes only, an example of double density HAMR-BPM magnetic alloy bits in arrays of square islands in accordance with some embodiments.

FIG. 15F shows for illustrative purposes only, an example of double density HAMR-BPM magnetic alloy in arrays of square islands in accordance with some embodiments. FIG. 15F shows the substrate 710, soft underlayer (SUL) 720, heatsink (HS) layer 1592, thermal resistor (TR) layer 1594, seedlayer 730, etched patterned spacer layer 1554 having vertical sections of the spacer layer, and square islands 1572 on exposed sections of the seedlayer 730. Magnetic alloy segregant 1562 is deposited on etched patterned spacer layer 1554 having vertical sections of the spacer layer to separate square islands 1572 on exposed sections of the seedlayer 730 to produce double density magnetic grain growth of arrays of square islands 1572 in accordance with some embodiments.

The foregoing has described the principles, embodiments and modes of operation of the embodiments. However, the embodiments should not be construed as being limited to the particular embodiments discussed. The above described embodiments should be regarded as illustrative rather than restrictive, and it should be appreciated that variations may be made in those embodiments by workers skilled in the art without departing from the scope of the embodiments as defined by the following claims.

What is claimed is:

1. A method, comprising:
   creating a patterned resist layer on a substrate;
   selectively treating at least a resist-contacting layer on the substrate in contact with the patterned resist layer to create a patterned growth guiding mechanism, wherein the patterned growth guiding mechanism includes a portion of the resist-contacting layer; and
   growing patterned magnetic features guided by the patterned growth guiding mechanism.

2. The method of claim 1, wherein creating the patterned resist layer comprises creating the patterned resist layer over a seedlayer of the substrate by directed self-assembly, nanoimprint lithography, or a combination of directed self-assembly and nanoimprint lithography.

3. The method of claim 2, further comprising conformally depositing the resist-contacting layer over the patterned resist layer by atomic layer deposition or plasma-enhanced chemical vapor deposition.

4. The method of claim 3, wherein selectively treating at least the resist-contacting layer comprises selectively etching the resist-contacting layer and the patterned resist layer to create the patterned growth guiding mechanism comprising sidewalls and areas exposing the seedlayer between the sidewalls.

5. The method of claim 4, further comprising depositing a magnetic alloy and a magnetic alloy segregant to grow patterned magnetic features atop the areas exposing the seedlayer, wherein the patterned magnetic features are segregated by the magnetic alloy segregant.

6. The method of claim 2, wherein the seedlayer is the resist-contacting layer.

7. The method of claim 6, wherein selectively treating at least the resist-contacting layer comprises selectively etching the seedlayer and the patterned resist layer to create the patterned growth guiding mechanism comprising a plurality of trench-separated protrusions in the seedlayer.

8. The method of claim 7, further comprising depositing a magnetic alloy and a magnetic alloy segregant to grow patterned magnetic features atop the protrusions, wherein the patterned magnetic features are segregated by the magnetic alloy segregant.

9. The method of claim 6, wherein selectively treating at least the resist-contacting layer comprises selectively oxidizing the seedlayer to create areas of oxidized seedlayer.

10. The method of claim 9, further comprising removing the patterned resist layer to create the patterned growth guiding mechanism comprising the areas of oxidized seedlayer and areas of non-oxidized seedlayer.

11. The method of claim 10, further comprising depositing a magnetic alloy and a magnetic alloy segregant to grow patterned magnetic features atop the areas of oxidized seedlayer, wherein the patterned magnetic features are segregated by the magnetic alloy segregant.

12. A method, comprising:
   creating a patterned layer on a substrate;
   selectively treating at least a patterned layer-contacting layer on the substrate in contact with the patterned layer to create a template, wherein template includes a portion of the patterned layer-contacting layer; and
   growing magnetic features guided by the template.

13. The method of claim 12, wherein creating the patterned layer comprises creating the patterned-layer on a seedlayer by directed self-assembly, nanoimprint lithography, or a combination of directed self-assembly and nanoimprint lithography.

14. The method of claim 13, wherein selectively treating at least the patterned layer-contacting layer comprises selectively etching at least the patterned layer-contacting layer to expose areas of the seedlayer favorable for growing the magnetic features.

15. The method of claim 13, wherein selectively treating at least the patterned layer-contacting layer comprises selectively oxidizing at least the patterned layer-contacting layer to create areas of the seedlayer unfavorable for growing the magnetic features.

16. The method of claim 13, wherein the seedlayer comprises TiN, Pt, CrX, wherein X is a Cr-alloying element; the magnetic features comprise FePt; and the magnetic features are segregated by a magnetic alloy segregant comprising C or $SiO_2$.

17. A method, comprising:
   creating a first layer comprising a pre-pattern on a substrate;
   selectively treating at least a second layer on the substrate in contact with the first layer to create a template, wherein the template includes a portion of the second layer; and
   growing magnetic features guided by the template.

18. The method of claim 17, wherein creating the first layer comprising the pre-pattern comprises creating the pre-pattern on a seed layer by directed self-assembly, nanoimprint lithography, or a combination of directed self-assembly and nanoimprint lithography.

19. The method of claim 18, wherein selectively treating at least the second layer comprises selectively etching at least the second layer to expose areas of the seedlayer favorable for growing the magnetic features.

20. The method of claim 18, wherein selectively treating at least the second layer comprises selectively oxidizing at least the second layer to create areas of the seedlayer unfavorable for growing the magnetic features.

* * * * *